(12) United States Patent
Savchenko et al.

(10) Patent No.: US 12,361,432 B1
(45) Date of Patent: Jul. 15, 2025

(54) SYSTEM AND METHOD FOR CUSTOMER AND/OR CONTAINER DISCOVERY BASED ON GPS DRIVE PATH ANALYSIS FOR A WASTE / RECYCLING SERVICE VEHICLE

(71) Applicant: WM INTELLECTUAL PROPERTY HOLDINGS, L.L.C., Houston, TX (US)

(72) Inventors: Sergiy Savchenko, Houston, TX (US); Hemachandra Pillutla, Houston, TX (US)

(73) Assignee: WM INTELLECTUAL PROPERTY HOLDINGS, L.L.C., Houston, TX (US)

(*) Notice: Subject to any disclaimer, the term of this patent is extended or adjusted under 35 U.S.C. 154(b) by 0 days.

(21) Appl. No.: 17/384,487

(22) Filed: Jul. 23, 2021

Related U.S. Application Data

(60) Provisional application No. 63/158,748, filed on Mar. 9, 2021.

(51) Int. Cl.

| | |
|---|---|
| *G06Q 30/018* | (2023.01) |
| *B60W 40/10* | (2012.01) |
| *G01C 21/34* | (2006.01) |
| *G01C 21/36* | (2006.01) |
| *G01S 19/42* | (2010.01) |
| *G06Q 10/30* | (2023.01) |
| *G06Q 50/26* | (2024.01) |
| *G07C 5/00* | (2006.01) |

(52) U.S. Cl.
CPC .......... *G06Q 30/018* (2013.01); *B60W 40/10* (2013.01); *G01C 21/3407* (2013.01); *G01C 21/3626* (2013.01); *G01S 19/42* (2013.01); *G06Q 10/30* (2013.01); *G06Q 50/26* (2013.01); *G07C 5/008* (2013.01); *B60W 2520/00* (2013.01)

(58) Field of Classification Search
None
See application file for complete search history.

(56) References Cited

U.S. PATENT DOCUMENTS

| | | | |
|---|---|---|---|
| 1,112,841 | A | 10/1914 | Rugh |
| 3,202,305 | A | 8/1965 | Hierpich |
| 5,072,833 | A | 12/1991 | Hansen et al. |
| 5,230,393 | A | 7/1993 | Mezey |

(Continued)

FOREIGN PATENT DOCUMENTS

| | | |
|---|---|---|
| CA | 2632738 | 5/2016 |
| CA | 2632689 | 10/2016 |

(Continued)

OTHER PUBLICATIONS

US 9,092,921 B2, 07/2015, Lambert et al. (withdrawn)

(Continued)

*Primary Examiner* — Jan P Mincarelli
(74) *Attorney, Agent, or Firm* — Greenberg Traurig LLP

(57) ABSTRACT

A system and method for vehicle drive path analysis for a waste/recycling service vehicle are provided. The system and method can enable identifying of the customers and/or container locations for waste and recycling collection routes using vehicle drive path analysis. Some non-limiting properties that can be derived from the analysis include the customer location, address of customers, and/or the locations of containers at the customer location.

24 Claims, 23 Drawing Sheets

(56) References Cited

U.S. PATENT DOCUMENTS

| | | |
|---|---|---|
| 5,245,137 A | 9/1993 | Bowman et al. |
| 5,278,914 A | 1/1994 | Kinoshita et al. |
| 5,489,898 A | 2/1996 | Shigekusa et al. |
| 5,565,846 A | 10/1996 | Geiszler et al. |
| 5,762,461 A | 6/1998 | Frohlingsdorf |
| 5,837,945 A | 11/1998 | Cornwell et al. |
| 6,097,995 A | 8/2000 | Tipton et al. |
| 6,408,261 B1 | 6/2002 | Durbin |
| 6,448,898 B1 | 9/2002 | Kasik |
| 6,510,376 B2 | 1/2003 | Burnstein et al. |
| 6,563,433 B2 | 5/2003 | Fujiwara |
| 6,729,540 B2 | 5/2004 | Ogawa |
| 6,811,030 B1 | 11/2004 | Compton et al. |
| 7,146,294 B1 | 12/2006 | Waitkus, Jr. |
| 7,330,128 B1 | 2/2008 | Lombardo et al. |
| 7,383,195 B2 | 6/2008 | Mallett et al. |
| 7,406,402 B1 | 7/2008 | Waitkus, Jr. |
| 7,501,951 B2 | 3/2009 | Maruca et al. |
| 7,511,611 B2 | 3/2009 | Sabino et al. |
| 7,536,457 B2 | 5/2009 | Miller |
| 7,659,827 B2 | 2/2010 | Gunderson et al. |
| 7,804,426 B2 | 9/2010 | Etcheson |
| 7,817,021 B2 | 10/2010 | Date et al. |
| 7,870,042 B2 | 1/2011 | Maruca et al. |
| 7,878,392 B2 | 2/2011 | Mayers et al. |
| 7,957,937 B2 | 6/2011 | Waitkus, Jr. |
| 7,994,909 B2 | 8/2011 | Maruca et al. |
| 7,999,688 B2 | 8/2011 | Healey et al. |
| 8,020,767 B2 | 9/2011 | Reeves et al. |
| 8,056,817 B2 | 11/2011 | Flood |
| 8,146,798 B2 | 4/2012 | Flood et al. |
| 8,185,277 B2 | 5/2012 | Flood et al. |
| 8,269,617 B2 | 9/2012 | Cook et al. |
| 8,314,708 B2 | 11/2012 | Gunderson et al. |
| 8,330,059 B2 | 12/2012 | Curotto |
| 8,332,247 B1 | 12/2012 | Bailey et al. |
| 8,373,567 B2 | 2/2013 | Denson |
| 8,374,746 B2 | 2/2013 | Plante |
| 8,384,540 B2 | 2/2013 | Reyes et al. |
| 8,417,632 B2 | 4/2013 | Robohm et al. |
| 8,433,617 B2 | 4/2013 | Goad et al. |
| 8,485,301 B2 | 7/2013 | Grubaugh et al. |
| 8,508,353 B2 | 8/2013 | Cook et al. |
| 8,542,121 B2 | 9/2013 | Maruca et al. |
| 8,550,252 B2 | 10/2013 | Borowski et al. |
| 8,564,426 B2 | 10/2013 | Cook et al. |
| 8,564,446 B2 | 10/2013 | Gunderson et al. |
| 8,602,298 B2 | 12/2013 | Gonen |
| 8,606,492 B1 | 12/2013 | Botnen |
| 8,630,773 B2 | 1/2014 | Lee et al. |
| 8,645,189 B2 | 2/2014 | Lyle |
| 8,674,243 B2 | 3/2014 | Curotto |
| 8,676,428 B2 | 3/2014 | Richardson et al. |
| 8,714,440 B2 | 5/2014 | Flood et al. |
| 8,738,423 B2 | 5/2014 | Lyle |
| 8,744,642 B2 | 6/2014 | Nemat-Nasser et al. |
| 8,803,695 B2 | 8/2014 | Denson |
| 8,818,908 B2 | 8/2014 | Altice et al. |
| 8,849,501 B2 | 9/2014 | Cook et al. |
| 8,854,199 B2 | 10/2014 | Cook et al. |
| 8,862,495 B2 | 10/2014 | Ritter |
| 8,880,279 B2 | 11/2014 | Plante |
| 8,930,072 B1 | 1/2015 | Lambert et al. |
| 8,952,819 B2 | 2/2015 | Nemat-Nasser |
| 8,970,703 B1 | 3/2015 | Thomas et al. |
| 8,996,234 B1 | 3/2015 | Tamari et al. |
| 9,047,721 B1 | 6/2015 | Botnen |
| 9,058,706 B2 | 6/2015 | Cheng |
| 9,098,884 B2 | 8/2015 | Borowski et al. |
| 9,098,956 B2 | 8/2015 | Lambert et al. |
| 9,111,453 B1 | 8/2015 | Alselimi |
| 9,158,962 B1 | 10/2015 | Nemat-Nasser et al. |
| 9,180,887 B2 | 11/2015 | Nemat-Nasser et al. |
| 9,189,899 B2 | 11/2015 | Cook et al. |
| 9,226,004 B1 | 12/2015 | Plante |
| 9,235,750 B1 | 1/2016 | Sutton et al. |
| 9,238,467 B1 | 1/2016 | Hoye et al. |
| 9,240,079 B2 | 1/2016 | Lambert et al. |
| 9,240,080 B2 | 1/2016 | Lambert et al. |
| 9,245,391 B2 | 1/2016 | Cook et al. |
| 9,247,040 B1 | 1/2016 | Sutton |
| 9,251,388 B2 | 2/2016 | Flood |
| 9,268,741 B1 | 2/2016 | Lambert et al. |
| 9,275,090 B2 | 3/2016 | Denson |
| 9,280,857 B2 | 3/2016 | Lambert et al. |
| 9,292,980 B2 | 3/2016 | Cook et al. |
| 9,298,575 B2 | 3/2016 | Tamari et al. |
| 9,317,980 B2 | 4/2016 | Cook et al. |
| 9,330,287 B2 | 5/2016 | Graczyk et al. |
| 9,341,487 B2 | 5/2016 | Bonhomme |
| 9,342,884 B2 | 5/2016 | Mask |
| 9,344,683 B1 | 5/2016 | Nemat-Nasser et al. |
| 9,347,818 B2 | 5/2016 | Curotto |
| 9,358,926 B2 | 6/2016 | Lambert et al. |
| 9,373,257 B2 | 6/2016 | Bonhomme |
| 9,389,147 B1 | 7/2016 | Lambert et al. |
| 9,390,568 B2 | 7/2016 | Nemat-Nasser et al. |
| 9,396,453 B2 | 7/2016 | Hynes et al. |
| 9,401,985 B2 | 7/2016 | Sutton |
| 9,403,278 B1 | 8/2016 | Van Kampen et al. |
| 9,405,992 B2 | 8/2016 | Badholm et al. |
| 9,418,488 B1 | 8/2016 | Lambert |
| 9,428,195 B1 | 8/2016 | Surpi |
| 9,442,194 B2 | 9/2016 | Kurihara et al. |
| 9,463,110 B2 | 10/2016 | Nishtala et al. |
| 9,466,212 B1 | 10/2016 | Stumphauzer et al. |
| 9,472,083 B2 | 10/2016 | Nemat-Nasser |
| 9,495,811 B2 | 11/2016 | Herron |
| 9,501,690 B2 | 11/2016 | Nemat-Nasser et al. |
| 9,520,046 B2 | 12/2016 | Call et al. |
| 9,525,967 B2 | 12/2016 | Mamlyuk |
| 9,546,040 B2 | 1/2017 | Flood et al. |
| 9,573,601 B2 | 2/2017 | Hoye et al. |
| 9,574,892 B2 | 2/2017 | Rodoni |
| 9,586,756 B2 | 3/2017 | O'Riordan et al. |
| 9,589,393 B2 | 3/2017 | Botnen |
| 9,594,725 B1 | 3/2017 | Cook et al. |
| 9,595,191 B1 | 3/2017 | Surpi |
| 9,597,997 B2 | 3/2017 | Mitsuta et al. |
| 9,604,648 B2 | 3/2017 | Tamari et al. |
| 9,633,318 B2 | 4/2017 | Plante |
| 9,633,576 B2 | 4/2017 | Reed |
| 9,639,535 B1 | 5/2017 | Ripley |
| 9,646,651 B1 | 5/2017 | Richardson |
| 9,650,051 B2 | 5/2017 | Hoye et al. |
| 9,679,210 B2 | 6/2017 | Sutton et al. |
| 9,685,098 B1 | 6/2017 | Kypri |
| 9,688,282 B2 | 6/2017 | Cook |
| 9,702,113 B2 | 7/2017 | Kotaki et al. |
| 9,707,595 B2 | 7/2017 | Ripley |
| 9,721,342 B2 | 8/2017 | Mask |
| 9,734,717 B1 | 8/2017 | Surpi et al. |
| 9,754,382 B2 | 9/2017 | Rodoni |
| 9,766,086 B1 | 9/2017 | Rodoni |
| 9,778,058 B2 | 10/2017 | Rodoni |
| 9,803,994 B1 | 10/2017 | Rodoni |
| 9,824,336 B2 | 11/2017 | Borges et al. |
| 9,824,337 B1 | 11/2017 | Rodoni |
| 9,829,892 B1 | 11/2017 | Rodoni |
| 9,834,375 B2 | 12/2017 | Jenkins et al. |
| 9,852,405 B1 | 12/2017 | Rodoni et al. |
| 10,029,685 B1 * | 7/2018 | Hubbard .............. B60W 30/146 |
| 10,152,737 B2 | 12/2018 | Lyman |
| 10,198,718 B2 | 2/2019 | Rodoni |
| 10,204,324 B2 | 2/2019 | Rodoni |
| 10,210,623 B2 | 2/2019 | Rodoni |
| 10,255,577 B1 | 4/2019 | Steves et al. |
| 10,311,501 B1 | 6/2019 | Rodoni |
| 10,332,197 B2 | 6/2019 | Kekalainen et al. |
| 10,354,232 B2 | 7/2019 | Tomlin, Jr. et al. |
| 10,382,915 B2 | 8/2019 | Rodoni |
| 10,410,183 B2 | 9/2019 | Bostick et al. |
| 10,594,991 B1 | 3/2020 | Skolnick |
| 10,625,934 B2 | 4/2020 | Mallady |

(56) References Cited

U.S. PATENT DOCUMENTS

| | | |
|---|---|---|
| 10,628,805 B2 | 4/2020 | Rodatos |
| 10,750,134 B1 | 8/2020 | Skolnick |
| 10,855,958 B1 | 12/2020 | Skolnick |
| 10,911,726 B1 | 2/2021 | Skolnick |
| 11,074,557 B2 | 7/2021 | Flood |
| 11,128,841 B1 | 9/2021 | Skolnick |
| 11,140,367 B1 | 10/2021 | Skolnick |
| 11,172,171 B1 | 11/2021 | Skolnick |
| 11,222,491 B2 | 1/2022 | Romano et al. |
| 11,315,085 B2 | 4/2022 | Candel et al. |
| 11,340,079 B1 | 5/2022 | Ebrahimi Afrouzi et al. |
| 11,348,269 B1 | 5/2022 | Ebrahimi Afrouzi et al. |
| 11,373,536 B1 | 6/2022 | Savchenko |
| 11,386,362 B1 | 7/2022 | Kim |
| 11,425,340 B1 | 8/2022 | Skolnick |
| 11,475,416 B1 | 10/2022 | Patel et al. |
| 11,475,417 B1 | 10/2022 | Patel et al. |
| 11,488,118 B1 | 11/2022 | Patel et al. |
| 11,616,933 B1 | 3/2023 | Skolnick |
| 11,640,764 B1 | 5/2023 | Alonso Lopez et al. |
| 11,673,740 B2 | 6/2023 | Leon |
| 11,715,150 B2 | 8/2023 | Rodoni |
| 11,727,337 B1 | 8/2023 | Savchenko |
| 11,790,290 B1 | 10/2023 | Kim et al. |
| 11,928,693 B1 | 3/2024 | Savchenko et al. |
| 11,977,381 B1 | 5/2024 | Patel et al. |
| 12,015,880 B1 | 6/2024 | Skolnick |
| 12,136,071 B1 | 11/2024 | Patel et al. |
| 12,266,268 B1 | 4/2025 | Savchenko et al. |
| 2002/0069097 A1 | 6/2002 | Conrath |
| 2002/0077875 A1 | 6/2002 | Nadir |
| 2002/0125315 A1 | 9/2002 | Ogawa |
| 2002/0194144 A1 | 12/2002 | Berry |
| 2003/0014334 A1 | 1/2003 | Tsukamoto |
| 2003/0031543 A1 | 2/2003 | Elbrink |
| 2003/0069745 A1 | 4/2003 | Zenko |
| 2003/0191658 A1 | 10/2003 | Rajewski |
| 2003/0233261 A1 | 12/2003 | Kawahara et al. |
| 2004/0039595 A1 | 2/2004 | Berry |
| 2004/0167799 A1 | 8/2004 | Berry |
| 2005/0038572 A1 | 2/2005 | Krupowicz |
| 2005/0080520 A1 | 4/2005 | Kline et al. |
| 2005/0182643 A1 | 8/2005 | Shirvanian |
| 2005/0209825 A1 | 9/2005 | Ogawa |
| 2005/0234911 A1 | 10/2005 | Hess et al. |
| 2005/0261917 A1 | 11/2005 | Forget Shield |
| 2006/0235808 A1 | 10/2006 | Berry |
| 2007/0150138 A1 | 6/2007 | Plante |
| 2007/0260466 A1 | 11/2007 | Casella et al. |
| 2007/0278140 A1 | 12/2007 | Mallett et al. |
| 2008/0010197 A1 | 1/2008 | Scherer |
| 2008/0065324 A1 | 3/2008 | Muramatsu et al. |
| 2008/0077541 A1 | 3/2008 | Scherer et al. |
| 2008/0202357 A1 | 8/2008 | Flood |
| 2008/0234889 A1 | 9/2008 | Sorensen |
| 2009/0014363 A1 | 1/2009 | Gonen et al. |
| 2009/0024479 A1 | 1/2009 | Gonen et al. |
| 2009/0055239 A1 | 2/2009 | Waitkus, Jr. |
| 2009/0083090 A1 | 3/2009 | Rolfes et al. |
| 2009/0126473 A1 | 5/2009 | Porat et al. |
| 2009/0138358 A1 | 5/2009 | Gonen et al. |
| 2009/0157255 A1 | 6/2009 | Plante |
| 2009/0161907 A1 | 6/2009 | Healey et al. |
| 2010/0017276 A1 | 1/2010 | Wolff et al. |
| 2010/0071572 A1 | 3/2010 | Carroll et al. |
| 2010/0119341 A1 | 5/2010 | Flood et al. |
| 2010/0175556 A1 | 7/2010 | Kummer et al. |
| 2010/0185506 A1 | 7/2010 | Wolff et al. |
| 2010/0217715 A1 | 8/2010 | Lipcon |
| 2010/0312601 A1 | 12/2010 | Lin |
| 2011/0108620 A1 | 5/2011 | Wadden et al. |
| 2011/0116899 A1 | 5/2011 | Dickens |
| 2011/0137776 A1 | 6/2011 | Goad et al. |
| 2011/0208429 A1 | 8/2011 | Zheng et al. |
| 2011/0225098 A1 | 9/2011 | Wolff et al. |
| 2011/0260878 A1 | 10/2011 | Rigling |
| 2011/0279245 A1 | 11/2011 | Hynes et al. |
| 2011/0316689 A1 | 12/2011 | Reyes et al. |
| 2012/0029980 A1 | 2/2012 | Paz et al. |
| 2012/0029985 A1 | 2/2012 | Wilson et al. |
| 2012/0047080 A1 | 2/2012 | Rodatos |
| 2012/0262568 A1 | 10/2012 | Ruthenberg |
| 2012/0265589 A1 | 10/2012 | Whittier |
| 2012/0310691 A1 | 12/2012 | Carlsson et al. |
| 2013/0024335 A1 | 1/2013 | Lok |
| 2013/0039728 A1 | 2/2013 | Price et al. |
| 2013/0041832 A1 | 2/2013 | Rodatos |
| 2013/0075468 A1 | 3/2013 | Wadden et al. |
| 2013/0311089 A1 | 11/2013 | Freed et al. |
| 2013/0332238 A1 | 12/2013 | Lyle |
| 2013/0332247 A1 | 12/2013 | Gu |
| 2014/0060939 A1 | 3/2014 | Eppert |
| 2014/0112673 A1 | 4/2014 | Sayama |
| 2014/0114868 A1 | 4/2014 | Wan et al. |
| 2014/0172174 A1 | 6/2014 | Poss et al. |
| 2014/0214697 A1 | 7/2014 | Mcsweeney |
| 2014/0236446 A1 | 8/2014 | Spence |
| 2014/0278630 A1 | 9/2014 | Gates et al. |
| 2014/0379588 A1 | 12/2014 | Gates et al. |
| 2015/0095103 A1 | 4/2015 | Rajamani et al. |
| 2015/0100428 A1 | 4/2015 | Parkinson, Jr. |
| 2015/0144012 A1 | 5/2015 | Frybarger |
| 2015/0278759 A1 | 10/2015 | Harris et al. |
| 2015/0294431 A1 | 10/2015 | Fiorucci et al. |
| 2015/0298903 A1 | 10/2015 | Luxford |
| 2015/0302364 A1 | 10/2015 | Calzada et al. |
| 2015/0307273 A1 | 10/2015 | Lyman |
| 2015/0324760 A1 | 11/2015 | Borowski et al. |
| 2015/0326829 A1 | 11/2015 | Kurihara et al. |
| 2015/0348252 A1 | 12/2015 | Mask |
| 2015/0350610 A1 | 12/2015 | Loh |
| 2016/0021287 A1 | 1/2016 | Loh |
| 2016/0044285 A1 | 2/2016 | Gasca et al. |
| 2016/0179065 A1 | 6/2016 | Shahabdeen |
| 2016/0187188 A1 | 6/2016 | Curotto |
| 2016/0224846 A1 | 8/2016 | Cardno |
| 2016/0232498 A1 | 8/2016 | Tomlin, Jr. et al. |
| 2016/0239689 A1 | 8/2016 | Flood |
| 2016/0247058 A1 | 8/2016 | Kreiner et al. |
| 2016/0292653 A1 | 10/2016 | Gonen |
| 2016/0300297 A1 | 10/2016 | Kekalainen et al. |
| 2016/0321619 A1 | 11/2016 | Inan et al. |
| 2016/0334236 A1 | 11/2016 | Mason et al. |
| 2016/0335814 A1 | 11/2016 | Tamari et al. |
| 2016/0372225 A1 | 12/2016 | Lefkowitz et al. |
| 2016/0377445 A1 | 12/2016 | Rodoni |
| 2016/0379152 A1 | 12/2016 | Rodoni |
| 2016/0379154 A1 | 12/2016 | Rodoni |
| 2017/0008671 A1 | 1/2017 | Whitman et al. |
| 2017/0011363 A1 | 1/2017 | Whitman et al. |
| 2017/0029209 A1 | 2/2017 | Smith et al. |
| 2017/0046528 A1 | 2/2017 | Lambert |
| 2017/0061222 A1 | 3/2017 | Hoye et al. |
| 2017/0076249 A1 | 3/2017 | Byron et al. |
| 2017/0081120 A1 | 3/2017 | Liu et al. |
| 2017/0086230 A1 | 3/2017 | Azevedo et al. |
| 2017/0109704 A1 | 4/2017 | Lettieri et al. |
| 2017/0116583 A1 | 4/2017 | Rodoni |
| 2017/0116668 A1 | 4/2017 | Rodoni |
| 2017/0118609 A1 | 4/2017 | Rodoni |
| 2017/0121107 A1 | 5/2017 | Flood et al. |
| 2017/0124533 A1 | 5/2017 | Rodoni |
| 2017/0154287 A1 | 6/2017 | Kalinowski et al. |
| 2017/0176986 A1 | 6/2017 | High et al. |
| 2017/0193798 A1 | 7/2017 | Call et al. |
| 2017/0200333 A1 | 7/2017 | Plante |
| 2017/0203706 A1 | 7/2017 | Reed |
| 2017/0221017 A1 | 8/2017 | Gonen |
| 2017/0243269 A1 | 8/2017 | Rodini et al. |
| 2017/0243363 A1 | 8/2017 | Rodini |
| 2017/0277726 A1 | 9/2017 | Huang et al. |
| 2017/0308871 A1 | 10/2017 | Tallis |
| 2017/0330134 A1 | 11/2017 | Botea et al. |
| 2017/0344959 A1 | 11/2017 | Bostick et al. |

(56) References Cited

U.S. PATENT DOCUMENTS

| | | |
|---|---|---|
| 2017/0345169 A1 | 11/2017 | Rodoni |
| 2017/0350716 A1 | 12/2017 | Rodoni |
| 2017/0355522 A1 | 12/2017 | Salinas et al. |
| 2017/0364872 A1 | 12/2017 | Rodoni |
| 2018/0012172 A1 | 1/2018 | Rodoni |
| 2018/0025329 A1 | 1/2018 | Podgorny et al. |
| 2018/0044109 A1 | 2/2018 | Butcher et al. |
| 2018/0075417 A1 | 3/2018 | Gordon et al. |
| 2018/0158033 A1 | 6/2018 | Woods et al. |
| 2018/0194305 A1 | 7/2018 | Reed |
| 2018/0224287 A1 | 8/2018 | Rodini et al. |
| 2018/0231388 A1 | 8/2018 | Rodoni |
| 2018/0245940 A1 | 8/2018 | Dong et al. |
| 2018/0247351 A1 | 8/2018 | Rodoni |
| 2019/0005466 A1 | 1/2019 | Rodoni |
| 2019/0019167 A1 | 1/2019 | Candel et al. |
| 2019/0050879 A1 | 2/2019 | Zhang et al. |
| 2019/0056416 A1 | 2/2019 | Rodoni |
| 2019/0065901 A1 | 2/2019 | Amato et al. |
| 2019/0095687 A1 | 3/2019 | Shaw et al. |
| 2019/0121368 A1 | 4/2019 | Bussetti et al. |
| 2019/0196965 A1 | 6/2019 | Zhang et al. |
| 2019/0197498 A1 | 6/2019 | Gates et al. |
| 2019/0210798 A1 | 7/2019 | Schultz |
| 2019/0217342 A1 | 7/2019 | Parr et al. |
| 2019/0244267 A1 | 8/2019 | Rattner et al. |
| 2019/0311333 A1 | 10/2019 | Kekalainen et al. |
| 2019/0360822 A1 | 11/2019 | Rodoni et al. |
| 2019/0385384 A1* | 12/2019 | Romano ............ G01C 21/3697 |
| 2020/0013024 A1 | 1/2020 | Armstrong et al. |
| 2020/0034785 A1 | 1/2020 | Romano et al. |
| 2020/0082167 A1 | 3/2020 | Shalom et al. |
| 2020/0082354 A1 | 3/2020 | Kurani |
| 2020/0109963 A1 | 4/2020 | Zass |
| 2020/0175556 A1 | 6/2020 | Podgorny |
| 2020/0189844 A1 | 6/2020 | Sridhar |
| 2020/0191580 A1 | 6/2020 | Christensen et al. |
| 2020/0242747 A1 | 7/2020 | Watanabe |
| 2020/0401995 A1 | 12/2020 | Aggarwala et al. |
| 2021/0024068 A1 | 1/2021 | Lacaze et al. |
| 2021/0049559 A1 | 2/2021 | Kilburn |
| 2021/0060786 A1 | 3/2021 | Ha |
| 2021/0188541 A1 | 6/2021 | Kurani et al. |
| 2021/0217156 A1 | 7/2021 | Balachandran et al. |
| 2021/0345062 A1 | 11/2021 | Koga et al. |
| 2021/0371196 A1 | 12/2021 | Krishnamurthy et al. |
| 2022/0097958 A1 | 3/2022 | Gargaro et al. |
| 2022/0118854 A1 | 4/2022 | Davis et al. |
| 2022/0324472 A1 | 10/2022 | Kashu et al. |
| 2023/0117427 A1 | 4/2023 | Turner et al. |
| 2024/0004615 A1 | 1/2024 | Tao et al. |

FOREIGN PATENT DOCUMENTS

| | | |
|---|---|---|
| CN | 101482742 | 7/2009 |
| CN | 101512720 | 8/2009 |
| CN | 105787850 | 7/2016 |
| CN | 105929778 | 9/2016 |
| CN | 106296416 | 1/2017 |
| CN | 209870019 | 12/2019 |
| CN | 110751446 A | 2/2020 |
| CN | 111241949 A | 6/2020 |
| DE | 69305435 | 4/1997 |
| DE | 69902531 | 4/2003 |
| DE | 102012006536 | 10/2013 |
| EP | 577540 | 10/1996 |
| EP | 1084069 | 8/2002 |
| EP | 2028138 | 2/2009 |
| GB | 2447184 | 9/2008 |
| GB | 2508209 | 5/2014 |
| JP | 3662616 | 6/2005 |
| JP | 2012-206817 | 10/2012 |
| JP | 2013-142037 | 7/2013 |
| JP | 2021156581 A | 10/2021 |
| WO | 99/54237 | 10/1999 |
| WO | 2007/067772 | 6/2007 |
| WO | 2007/067775 | 6/2007 |
| WO | 2012/069839 | 5/2012 |
| WO | 2012/172395 | 12/2012 |
| WO | 2016/074608 | 5/2016 |
| WO | 2016/187677 | 12/2016 |
| WO | 2017/070228 | 4/2017 |
| WO | 2017/179038 | 10/2017 |
| WO | 2018/182858 | 10/2018 |
| WO | 2018/206766 | 11/2018 |
| WO | 2018/215682 | 11/2018 |
| WO | 2019/051340 | 3/2019 |
| WO | 2019/051340 A1 | 3/2019 |
| WO | 2019/150813 A1 | 8/2019 |

OTHER PUBLICATIONS

Nilopherjan, N. et al.; Automatic Garbage vol. Estimation Using SIFT Features Through Deep Neural Networks and Poisson Surface Reconstruction; International Journal of Pure and Applied Mathematics; vol. 119, No. 14; 2015; pp. 1101-1107.

Ghongane, Aishwarya et al.; Automatic Garbage Tracking and Collection System; International Journal of Advanced Technology in Engineering and Science; vol. 5, No. 4; Apr. 2017; pp. 166-173.

Rajani et al.; Waste Management System Based on Location Intelligence; 4 pages; Poojya Doddappa Appa Colleage of Engineering, Kalaburgi.

Waste Management Review; A clear vison on waste collections; Dec. 8, 2015; 5 pages; http://wastemanagementreiew.com/au/a-clear-vison-on-waste-collections/.

Waste Management Surveillance Solutiosn; Vehicle Video Cameral; Aug. 23, 2017; 6 pages; http://vehiclevideocameras.com/mobile-video-applications/waste-management-camera.html.

Rich, John I.; Truck Equipment: Creating a Safer Waste Truck Environment; Sep. 2013; pp. 18-20; WasteAdvantage Magainze.

Town of Prosper; News Release: Solid Waste Collection Trucks Equipped wit "Third Eye," video system aborad trash and recycling trucks to improve service; Jan. 13, 2017; 1 page; U.S.

Product News Network; Telematics/Live Video System Increases Driver Safety/Productivity; Mar. 30, 2015; 3 pages; Thomas Industrial Network, Inc.

Karidis, Arlene; Waste Pro to Install Hight-Tech Camera Systems in all Trucks to Address Driver Safety; Mar. 10, 2016; 2 pages; Wastedive.com.

Greenwalt, Megan; Finnish Company Uses IoT to Digitize Trash Bins; Sep. 14, 2016; 21 pages; www.waste360.com.

Georgakopoulos, Chris; Cameras Cut Recycling Contamination; The Daily Telegraph; Apr. 7, 2014; 2 pages.

Van Dongen, Matthew; Garbage 'Gotcha' Videos on Rise in City: Residents Irked Over Perceived Infractions; Nov. 18, 2015; 3 pages; The Spectator.

The Advertiser; Waste Service Drives Innovation; Jan. 25, 2016; 2 pages; Fairfax Media Publications Pty Limited; Australia.

rwp-wasteportal.com; Waste & Recycling Data Portal and Software; 16 pages; printed Oct. 3, 2019.

Bhargava, Hermant K. et al.; A Web-Based Decision Support System for Waste Disposal and Recycling; pp. 47-65; 1997; Comput. Environ. And Urban Systems, vol. 21, No. 1; Pergamon.

Kontokasta, Constantine E. et al.; Using Machine Learning and Small Area Estimation to Predict Building-Level Municipal Solid Waste Generation in Cities; pp. 151-162; 2018; Computer, Envieonment and Urban Systems; Elsevier.

Ferrer, Javier et al.; BIN-CT: Urban Waste Collection Based on Predicting the Container Fill Level; Apr. 23, 2019; 11 pages; Elsevier.

Vu, Hoang Lan et al.; Waste Management: Assessment of Waste Characteristics and Their Impact on GIS Vechicle Collection Route Optimization Using ANN Waste Forecasts; Environmental Systems Engineering; Mar. 22, 2019; 13 pages; Elsevier.

Hina, Syeda Mahlaqa; Municipal Solid Waste Collection Route Optimization Using Geospatial Techniques: A Case Study of Two Metropolitan Cities of Pakistan; Feb. 2016; 205 pages; U.S.

(56) References Cited

OTHER PUBLICATIONS

Kannangara, Miyuru et al.; Waste Management: Modeling and Prediction of Regional Municipal Soid Waste Generation and Diversion in Canada Using Machine Learning Approaches; Nov. 30, 2017; 3 pages; Elsevier.
Tan, Kah Chun et al.; Smart Land: AI Waste Sorting System; University of Malaya; 2 pages; Keysight Techonogies.
Oliveira, Veronica et al.; Journal of Cleaner Production: Artificial Neural Network Modelling of the Amount of Separately-Collected Household Packaging Waste; Nov. 8, 2018; 9 pages; Elsevier.
Zade, Jalili Ghazi et al.; Prediction of Municipal Solid Waste Generation by Use of Artificial Neural Network: A Case Study of Mashhad; Winter 2008; 10 pages; Int. J. Environ. Res., 2(1).
Sein, Myint Myint et al.; Trip Planning Query Based on Partial Sequenced Route Algorithm; 2019 IEEE 8th Global Conference; pp. 778-779.
A.F., Thompson et al.; Application of Geographic Information System to Solid Waste Management; Pan African Internatonal Conference on Information Science, Computing and Telecommunications; 2013; pp. 206-211.
Malakahmad, Amirhossein et al.; Solid Waste Collection System in Ipoh City, A Review; 2011 International Conference on Business, Engineering and Industrial Applications; pp. 174-179.
Ali, Tariq et al.; IoT-Based Smart Waste Bin Monitoring and Municipal Solid Waste Manaement System for Smart Cities; Arabian Journal for Science and Engineering; Jun. 4, 2020; 14 pages.
Alfeo, Antonio Luca et al.; Urban Swarms: A new approch for autonomous waste management; Mar. 1, 2019; 8 pages.
Jwad, Zainab Adnan et al.; An Optimization Approach for Waste Collection Routes Based on GIS in Hillah-Iraq; 2018; 4 pages; Publisher: IEEE.
Chaudhari, Sangita S. et al.; Solid Waste Collection as a Service using IoT-Solution for Smart Cities; 2018; 5 pages; Publisher: IEEE.
Burnley, S.J. et al.; Assessing the composition of municipal solid waste in Wales; May 2, 2006; pp. 264-283; Elsevier B.V.
Lokuliyana, Shashika et al.; Location based garbage management system with IoT for smart city; 13th ICCSE; Aug. 8-11, 2018; pp. 699-703.
Ma, Enlin et al.; Review of Cutting-Edge Sensing Technologies for Urban Underground Construction; Measurement 167; Jan. 2021; pp. 1-16.
Adedeji, Olugbaja et al.: Intelligent Waste Classification System Using Deep Learning Convolutional Neural Network; 2nd International Conference on Sustainable Materials Processing and Manufacturing; Elsevier B.V.; 2019; pp. 607-612.
Baldacci, Roberto et al.; The multiple disposal facilities and multiple inventory locations rollon-rolloff vehicle routing problem; Computers & Operations Research 33; 2006; pp. 2667-2702.
Chiussi, Andrea et al.; Industrial Waste Collection Optimization: A Real-World Case Study in Northern Italy; Springer Nature Switzerland AG; Sep. 2022; pp. 147-161.
Ghazali, M. et al.; Mobile Applicaiton On Garbage Collector Tracker Using Google Maps; Oct. 7, 2019; IEEE 9th International Conference on System Engineering and Technology; pp. 287-291.
Kim, Byung-In et al.; Waste Collection Vehicle Routing Problem with Time Windows; Computers and Operations Research; pp. 3624-3642; 2006.
Maia, J. et al.; An Iot Solution for Load Monitoring and Tracking of Garbage-Truck Fleets; IEEE Xplore; 2020; pp. 406-410.
Mojtahedi, Mohammad et al.; Sustainable Vehicle Routing Problem for Coordinated Solid Waste Management; Journal of Industrial Information Integration; Mar. 13, 2021; 23 pages.
Putra et al.; Waste Transportation Route Optimization in Malang Using Network Analysis; IOP Conf. Series; Earth and Environmental Science; 2020; 7 pages.
Rabbani, MD. Golam et al.; A Hybrid Metaheuristic Algorithm for Solving a Roll-on Roll-off Waste Collection Vehicle Routing Problem Considering Waste Separation and Recycling Center; International Journal of Applied Operational Research; Apr. 2016; pp. 19-31.
Raucq, Joel et al.; Solving a real-life roll-on-roll-off waste collection problem with col. generation; Journal on Vehicle Routing Algorithms; May 10, 2019; 14 pages.
Wy, Juyoung et al.; Rollon-Rolloff Vehicle Routing Problem in the Waste Collection Industry; 2010; 6 pages.
Harvey, Mark; Incorporating RFID Technology into Your Waste and Recycling Operations; Waste Advantage Magazine; Oct. 2014: pp. 21-23.
Islam, Shafiqul et al.; Overview for Solid Waste Bin Monitoring and Collection System; International Conference on Innovation Management and Technology Research, May 21, 2012; pp. 258-262; MALAYSIA.
Karadimas, Dimitris et al.; An integrated node for Smart-City applications based on active RFID tags; Use case on waste-bins; IEEE 21st international conference on emerging technologies and factory automation (ETFA); pp. 1-7; Sep. 6, 2016.
Purohit, Suchit et al.; RFID based solid waste collection process; IEEE Recent Advances in Intelligent Computational Systems; pp. 457-460; Sep. 22, 2011.
Vishnu, S. et al.; Sensor-Based Solid Waste Handling Systems: A Survey; Sensors 22, No. 6: 2340; Mar. 18, 2022; 19 pages.
Zhang, Hong et al.; Object Tracking for a Smart City Using IoT and Edge Computing; 2019; Sensors; pp. 1-23.

\* cited by examiner

SYSTEM AND METHOD FOR CUSTOMER AND/OR CONTAINER DISCOVERY BASED ON GPS DRIVE PATH ANALYSIS FOR A WASTE / RECYCLING SERVICE VEHICLE

BACKGROUND

1. Related Applications

This application claims the benefit, and priority benefit, of U.S. Provisional Patent Application Ser. No. 63/158,748, filed Mar. 9, 2021, the disclosure and contents of which are incorporated by reference herein in their entirety.

2. Field of Invention

The presently disclosed subject matter relates generally to vehicle drive path analysis for waste/recycling service vehicles.

3. Description of the Related Art

Waste/recycling service providers manage multiple routes each day across various lines of business including commercial, roll off and residential. Depending on the line of business, a particular route can have tens, hundreds or even thousands of customers that require service. The ability of a service provider to know or detect customer locations and service and/or container locations is important for the waste/recycling business. It allows for planning of routes and resources, as well as providing superior customer experience, service and support. In addition, service audits and confirmations can be established to aid the provider in preventing revenue leakage.

Well known approaches for detection of customer and/or container locations for waste and recycling operations include manual logging/actions for services by vehicle drivers, modifications to vehicles through equipment additions such as arm lift sensors, cameras, etc., and/or modifications to both vehicles and containers to collect telemetry data through sensors such as GPS, RFID etc. Each of these approaches can be expensive and burdensome. Further, there is no highly reliable means of data collection, integration and analysis for these various approaches to determine duration and location of customer service for waste collection.

Improvements in this field are therefore desired.

SUMMARY

In accordance with the presently disclosed subject matter, various illustrative embodiments of a system and method for customer and/or container discovery based on GPS drive path analysis for a waste/recycling service vehicle are described herein.

In certain illustrative embodiments, a method of identifying a residential customer location on a service route for a waste or recycling service vehicle is disclosed, which can include: collecting location information for the waste or recycling service vehicle during a plurality of time intervals as the service vehicle travels along the service route, wherein the location information is collected using a global positioning system (GPS) associated with the waste or recycling service vehicle; associating the location information with street network data relating to the service route; identifying a vehicle stop point on the service route based on one or more of: (i) a determination that the location information for two consecutive time intervals is the same or similar; and/or (ii) a determination based on low speed of the vehicle indicating that customer service is being performed; determining whether there is a correspondence between the vehicle stop point and parcel data information relating to the service route; and designating the location of the residential customer at a parcel from the parcel data information corresponding to the vehicle stop point. The street network data can include at least one of a street name, a street type, spatial geometry of the street, location of the vehicle on the street, and a side of the street on which residential waste or recycling services are provided. The parcel data information can include at least one of a parcel owner name, an address of the parcel, a type of land use associated with the parcel, geographic information relating to the spatial geometry of the boundary of the parcel, and geographic information relating to the centroid of the parcel. The method can further include displaying a segment of the service route on a geographic map on a display screen of a computerized user device; and identifying the vehicle stop point on the service route. The method can further include repeating the steps of collecting, associating, identifying, and determining for a plurality of iterations of the service vehicle traveling along the service route; and designating the location of the residential customer at the parcel corresponding to the vehicle stop point based on the plurality of iterations. The time intervals for collecting GPS pings can be ten seconds or less.

In certain illustrative embodiments, a system for identifying a residential customer location on a service route for a waste or recycling service vehicle is disclosed. The system can include a waste or recycling service vehicle; a memory storage area; and a processor in communication with the memory storage area and configured to: collect location information for the waste or recycling service vehicle during a plurality of time intervals as the service vehicle travels along the service route, wherein the location information is collected using a global positioning system (GPS) associated with the waste or recycling service vehicle; associate the location information with street network data relating to the service route; identify a vehicle stop point on the service route based on one or more of: (i) a determination that the location information for two consecutive time intervals is the same or similar; and/or (ii) a determination based on low speed of the vehicle indicating that customer service is being performed; determine whether there is a correspondence between the vehicle stop point and parcel data information relating to the service route; and designate the location of the residential customer at a parcel from the parcel data information corresponding to the vehicle stop point.

In certain illustrative embodiments, a method of identifying a commercial customer location on a service route for a waste or recycling service vehicle is disclosed, which can include: collecting location information for the waste or recycling service vehicle during a plurality of time intervals as the service vehicle travels along the service route, wherein the location information is collected using a global positioning system (GPS) associated with the waste or recycling service vehicle; associating the location information with street network data relating to the service route; identifying a vehicle stop point on the service route based on a determination that the location information for two consecutive time intervals is the same or similar; associating the vehicle stop point with corresponding customer account information; and designating the location of the commercial customer at the vehicle stop point based on the corresponding customer account information. The street network data can include at least one of a street name, a street type, a longitude or latitude of the street, a location of the vehicle on the street, and a side of the street on which residential waste or recycling services are provided. The method can further include displaying a segment of the service route on a geographic map on a display screen of a computerized user device; and identifying the vehicle stop point on the service route. The method can further include repeating the steps of collecting, associating, identifying, and determining for a plurality of iterations of the service vehicle traveling along the service route; and designating the location of the customer container at the vehicle stop point based on the plurality of iterations. The time intervals can be ten seconds are less. The method can further include verifying the location of the commercial customer at the vehicle stop point based on user data provided by a user on a computing device onboard the service vehicle and relating to the service route.

In certain illustrative embodiments, a system for identifying a commercial customer location on a service route for a waste or recycling service vehicle is provided. The system can include: a waste or recycling service vehicle; a memory storage area; and a processor in communication with the memory storage area and configured to: collect location information for the waste or recycling service vehicle during a plurality of time intervals as the service vehicle travels along the service route, wherein the location information is collected using a global positioning system (GPS) associated with the waste or recycling service vehicle; associate the location information with street network data relating to the service route; identify a vehicle stop point on the service route based on a determination that the location information for two consecutive time intervals is the same or similar; associate the vehicle stop point with corresponding customer account information; and designate the location of the commercial customer at the vehicle stop point based on the corresponding customer account information. The time intervals can be ten seconds or less. The processor can be further configured to: verify the location of the commercial customer at the vehicle stop point based on user data provided by a user on a computing device onboard the service vehicle and relating to the service route.

In certain illustrative embodiments, a method of identifying a residential container location on a service route for a waste or recycling service vehicle is provided, and can include: collecting location information for the waste or recycling service vehicle during a plurality of time intervals as the service vehicle travels along the service route, wherein the location information is collected using a global positioning system (GPS) associated with the waste or recycling service vehicle; associating the location information with street network data relating to the service route; identifying a vehicle stop point on the service route based on one or more of: (i) a determination that the location information for two consecutive time intervals is the same or similar; and/or (ii) a determination based on low speed of the vehicle indicating that customer service is being performed; determining whether there is a correspondence between the vehicle stop point and parcel data information relating to the service route; designating the location of the residential customer at a parcel from the parcel data information corresponding to the vehicle stop point; and designating a container location for the residential customer at the vehicle stop point based on customer account properties associated with the vehicle stop point, wherein the customer account properties comprise one or more of: (i) geographic location of stop point; or (ii) time of stop point.

In certain illustrative embodiments, a system for identifying a residential container location on a service route for a waste or recycling service vehicle is provided. The system can include: a waste or recycling service vehicle; a memory storage area; and a processor in communication with the memory storage area and configured to: collect location information for the waste or recycling service vehicle during a plurality of time intervals as the service vehicle travels along the service route, wherein the location information is collected using a global positioning system (GPS) associated with the waste or recycling service vehicle; associate the location information with street network data relating to the service route; identify a vehicle stop point on the service route based on one or more of: (i) a determination that the location information for two consecutive time intervals is the same or similar; and/or (ii) a determination based on low speed of the vehicle indicating that customer service is being performed; determine whether there is a correspondence between the vehicle stop point and parcel data information relating to the service route; designate the location of the residential customer at a parcel from the parcel data information corresponding to the vehicle stop point; and designate a container location for the residential customer at the vehicle stop point based on customer account properties associated with the vehicle stop point, wherein the customer account properties comprise one or more of: (i) geographic location of stop point; or (ii) time of stop point.

In certain illustrative embodiments, a method of identifying a commercial container location on a service route for a waste or recycling service vehicle is provided, and can include: collecting location information for the waste or recycling service vehicle during a plurality of time intervals as the service vehicle travels along the service route, wherein the location information is collected using a global positioning system (GPS) associated with the waste or recycling service vehicle; associating the location information with street network data relating to the service route; identifying a vehicle stop point on the service route based on a determination that the location information for two consecutive time intervals is the same or similar; determining whether there is a correspondence between the vehicle stop point and customer accounts information; and designating a container location for the commercial customer at the vehicle stop point based on the customer accounts information. The method can further include: verifying the container location for the commercial customer based on user data provided by a user on a computing device onboard the service vehicle and relating to the service route. The method can further include determining whether the location information corresponds to an out-of-street location that is at least a pre-defined distance from a street segment in the street network data; associating the out-of-street location with a corresponding vehicle stop point; and associating the corresponding vehicle stop point with the container location.

In certain illustrative embodiments, a system for identifying a commercial container location on a service route for a waste or recycling service vehicle is disclosed, and can include: a waste or recycling service vehicle; a memory storage area; and a processor in communication with the memory storage area and configured to: collect location information for the waste or recycling service vehicle during a plurality of time intervals as the service vehicle travels along the service route, wherein the location information is collected using a global positioning system (GPS) associated with the waste or recycling service vehicle; associate the location information with street network data relating to the service route; identify a vehicle stop point on the service route based on a determination that the location information for two consecutive time intervals is the same or similar; determine whether there is a correspondence between the vehicle stop point and customer accounts information; and designate a container location for the commercial customer at the vehicle stop point based on the customer accounts information. The processor can be further configured to: verify the container location for the commercial customer based on user data provided by a user on a computing device onboard the service vehicle and relating to the service route. The processor can be further configured to: determine whether the location information corresponds to an out-of-street location that is at least a pre-defined distance from a street segment in the street network data; associate the out-of-street location with a corresponding vehicle stop point; and associate the corresponding vehicle stop point with the container location.

DETAILED DESCRIPTION

Figure 1A:
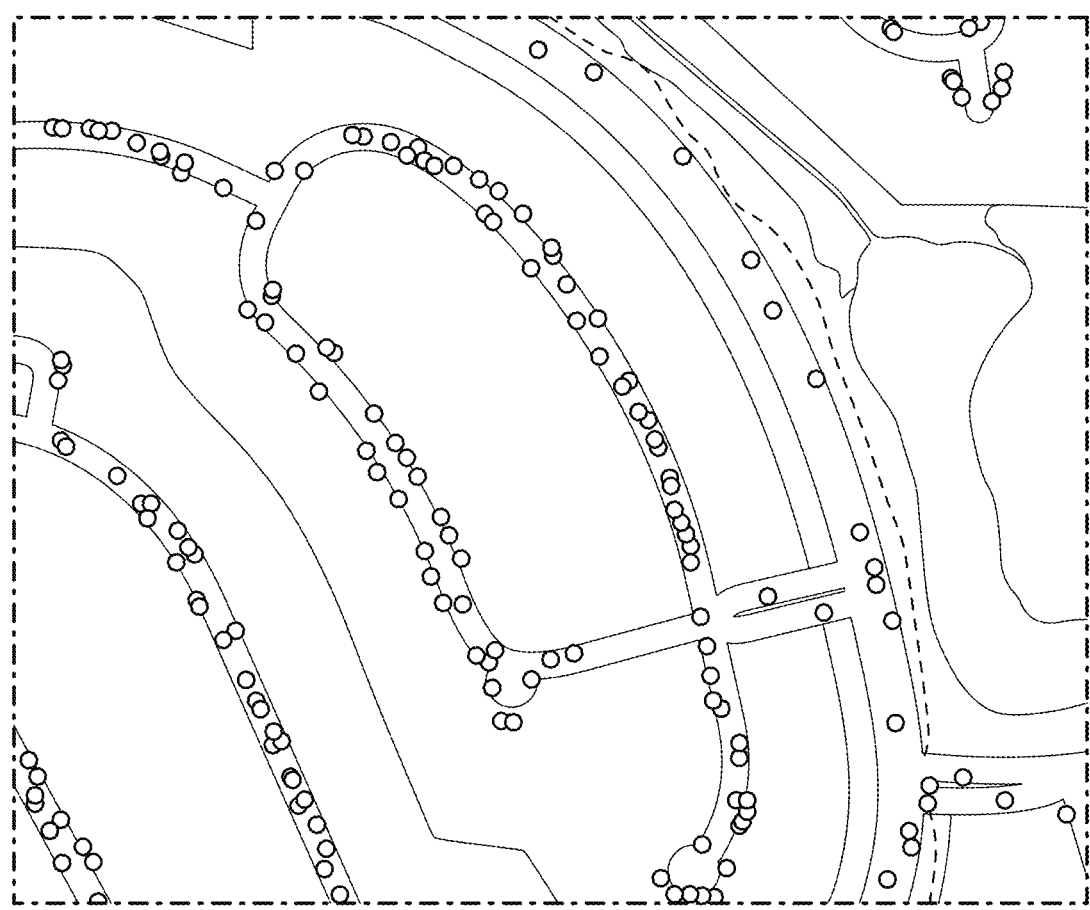
FIG. 1A is an image of the projected locations of GPS pings (circles) from a vehicle overlaid on a street network according to embodiments of the present disclosure.

Various illustrative embodiments of a system and method for vehicle drive path analysis for a waste/recycling service vehicle are described herein.

In certain illustrative embodiments, the presently disclosed system and method can enable identifying of the customers and/or container locations for waste and recycling collection routes using vehicle drive path analysis. Some non-limiting properties that can be derived from the analysis include the customer location, address of customers, and/or the locations of containers at the customer location.

The presently disclosed system and method can be utilized with various types of vehicles used for waste and recycling collection routes. Some non-limiting examples of vehicles types can include trucks such as front loader and rear loaders used in commercial lines of business, and automated side loaders and rear loaders used in residential lines of business. Automated side loaders in residential lines of business perform service only on one side of the street (nearest the right side of the vehicle), while rear loaders can perform service on both sides of the street (right and left). All these vehicles can also be equipped with onboard computer units (OBU) that enable driver interactions with the OBU and capturing of GPS data and events corresponding to a service.

The presently disclosed system and method can collect data in a variety of ways. Typically, a service vehicle (depending on vehicle type) can do a "quick stop" (from 3 to 10 seconds) to collect a load in a residential line of business. An average time span between GPS pings from the vehicle currently is configured for approximately 10 seconds. As a result, it is difficult to reliable identify customer stops less than 20 seconds in duration. On the other hand, areas can be detected where the vehicle is moving with low speed (less than 2 mi/hour) and services can be assumed at these locations. GPS ping data enables a determination of vehicle speed. Furthermore, GPS pings can also be configured to be transmitted at more frequent time span than 10 seconds.

In certain illustrative embodiments, the following primary sources of data can be used. First, GPS data can be received from the vehicle at intervals of 10 seconds or less corresponding to the location of the vehicle on the route. The individual GPS (ping) data is collected at periodic intervals (10 seconds or less) from a vehicle equipped with a GPS enabled device. Second, digital street network map layer data can be obtained in a spatially (geographic information systems (GIS) vector files) enabled format including street segments' geometries, street names, road types, driving restrictions, which can be gathered or ascertained from a variety of sources including, for example, from public domain data sources and/or from commercial map data providers. GIS Spatial vector file formats for map layer data are well known and includes formats such as shapefiles among others. Finally, parcel data can be obtained in GIS spatial vector file format as well and the data may include parcels' geometries representing the boundaries, address and parcel owner information as well the use of the parcel for residential or commercial purposed, which can be gathered and/or ascertained from a variety of sources including, for example, from public domain data sources and/or from commercial data providers.

Optionally, the following additional sources of user data may be used to augment the quality of analysis if available. Data can be collected from manual or automated events (by the vehicle driver) performed through an application residing on an onboard computer unit (OBU) on the vehicle. The OBU application may include route order of stops, customers' orders, and line of business (commercial, residential or roll off) and can enable the driver to status different events from the start of the route to the end of the route. Such events may include leave yard, arrive yard, arrive customer, depart customer, arrive landfill, depart landfill etc. These manual events are highly dependent on the driver performing the status updates at the correct location corresponding to the event and the correct time to make the data useful. Furthermore, for the residential line of business where the number of customer stops range from 800-1200, not all stops may be on the OBU and manual status updates of the events may not always be practical and expected for the driver to perform on account of various considerations including safety. Data for customer's route orders on the OBU may also have information such as the following: customer address; customer geocoded location (longitude, latitude in decimal degrees); number of containers at customer locations; size of containers at container locations; vehicle arrive time (OBU event with geographical position and timestamp); vehicle depart time (OBU event with geographical position and timestamp); vehicle arrive time (OBU event with geographical position and timestamp); and vehicle depart time (OBU event with geographical position and timestamp). Data may also be collected in an automated fashion with modifications to vehicles through equipment additions, and may enable additional data to be collected that can be optionally used, such as time at which the service is performed gathered from the sensor data, and location where there is a confirmed service (latitude, longitude) through the sensor data.

Various methods of detecting customers and/or container locations of customers are also disclosed herein. These methods can detect customers and/or containers belonging to different lines of business including commercial, residential and roll off. The methods also cover how customers are serviced on the street depending on the type of vehicle used to do service as well performing service for customers on one side or both sides of street. The methods also include accounting for the location of customer's container serviced relative to the customer property, either on the property of the customer or outside the property of customer close to the street curb.

In certain illustrative embodiments, GIS street network data can be utilized. As used herein, a street network is a GIS digital representation of streets and roads. The street network can be in a vector file format. A single segment of street network is called an edge. Street networks in vector file format provide multiple characteristics for edges and their connectivity. Geometry of an edge can be presented as a collection of points (two or more). In addition, a street name, range of house numbers on the street, and postal code can be associated with an edge along with other attributes such as direction of travel (one way, two way), side of the street (left side or right side), travel time, weight, height and other travel restrictions.

In certain illustrative embodiments, GPS (global positioning satellite) data can also be utilized. A GPS ping from a service vehicle enabled by a GPS device can have the following non-limiting list of properties: longitude (decimal degrees); latitude (decimal degrees); timestamp (coordinated universal time—UTC time); speed (miles per hour); and course (direction relative to north, degrees).

Figure 1B:
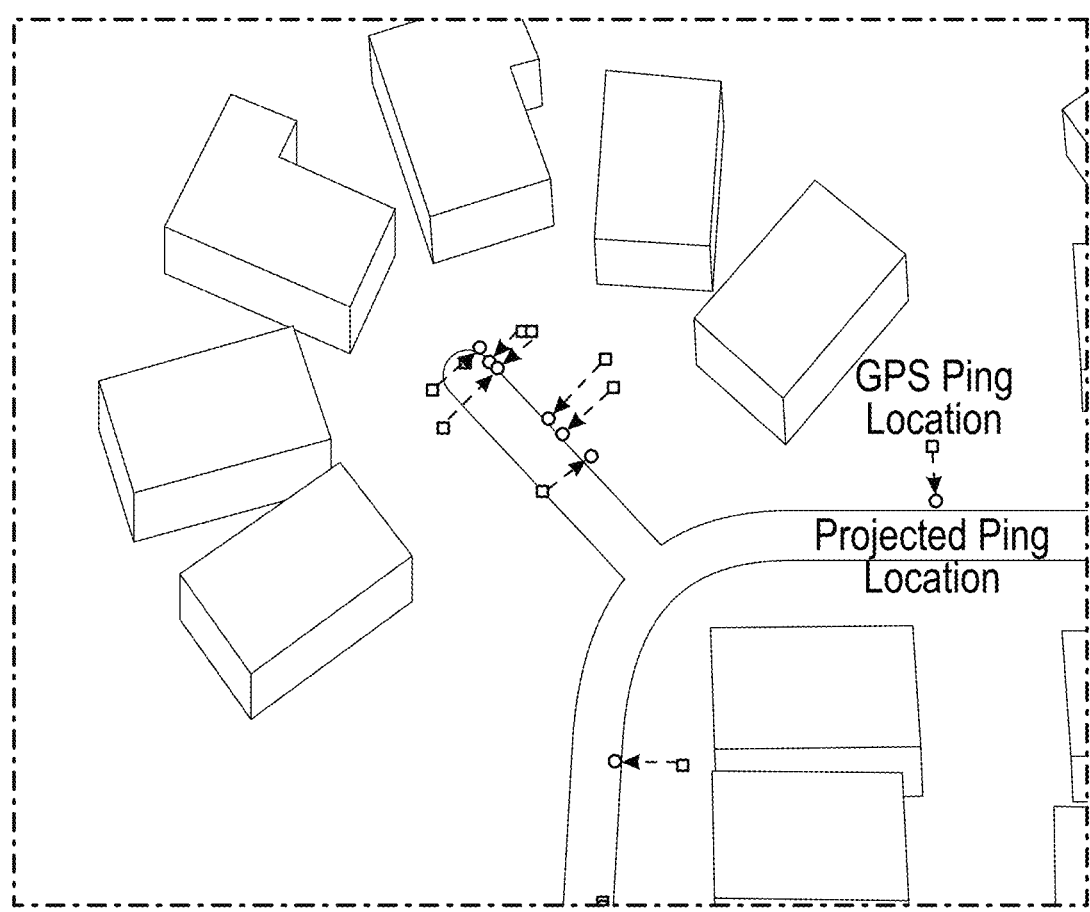
FIG. 1B is an image of locations of GPS pings (squares) from a vehicle along with the projected locations of the GPS pings (circles) overlaid on a street network through projection according to embodiments of the present disclosure.

FIG. 1A shows an illustrative embodiment of projected GPS pings overlaid on a street network, and FIG. 1B shows GPS pings overlaid on a street network through projection of GPS pings on the street network. As used in the figures herein, squares represent GPS ping locations, circles represent projected GPS ping locations, and triangles represent stops or interpolated stops from GPS pings. GPS ping locations collected from a GPS enabled device on a vehicle do not always align exactly with the vector file formats of streets represented on maps from street networks because of GPS accuracy or the way the GIS street vector files were created or digitized and represented on maps.

In certain illustrative embodiments, geospatial techniques and projecting GPS pings to a street network can be utilized to collect information about street name and street type to associate to a specific GPS ping. Projecting GPS pings or their groups with low speed to street network can yield the following properties: number of GPS pings within a group; total duration of a group of GPS pings with low speed; and distance of a projected GPS ping from the starting point of a street network edge. These properties combined with the properties of the route the truck belongs to could be associated with various factors. For example, they can be associated with a site (hauling company) the route belongs to. They can also be associated with date, such as the date the route was executed and what type of truck was used. In certain illustrative embodiments, multiple raw GPS locations can be represented by a single projected location on the street network.

Figure 2:
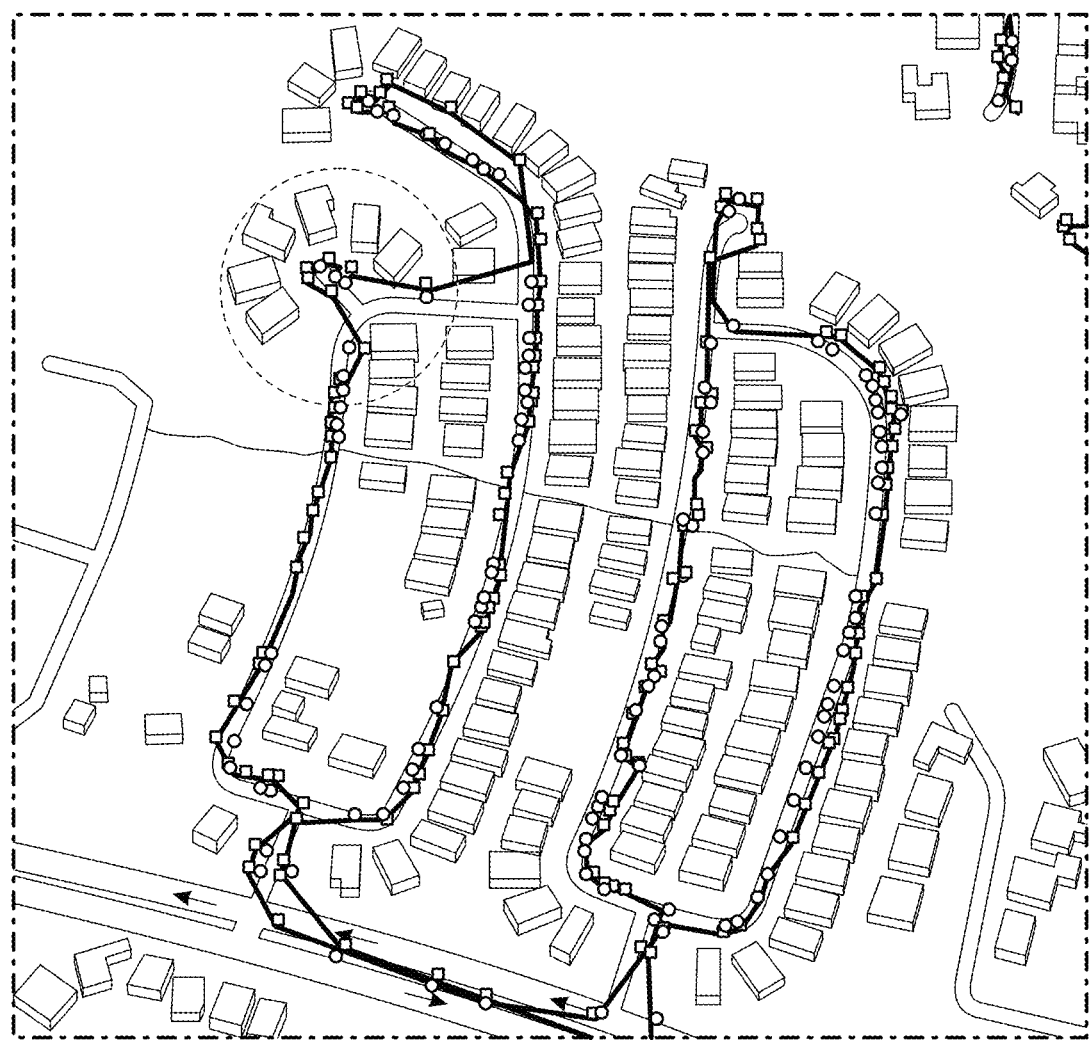
FIG. 2 is an image of route tracing enabled by projecting GPS ping locations (circles) from a vehicle on a street network with GPS pings (squares) according to embodiments of the present disclosure.

FIG. 2 shows a route trace enabled by projecting GPS pings on a street network with GPS pings (square), projected location on the street network (circle) and a solid line representing the connection of GPS pings for the route trace. In certain illustrative embodiments, projecting the GPS pings collected from the vehicle onto a close or adjacent street segment enables tracing of the route on the street network. This analysis of GPS ping data and projection to street network in vector format enables various types of data to be determined, such as the speed of the vehicle, direction of travel of the vehicle, if customer pick up or service was performed on one side or both sides of street, side of the street (left side or right side) the customer is on relative to the vehicle, and the stationary or moving nature of the vehicle.

Figure 3A:
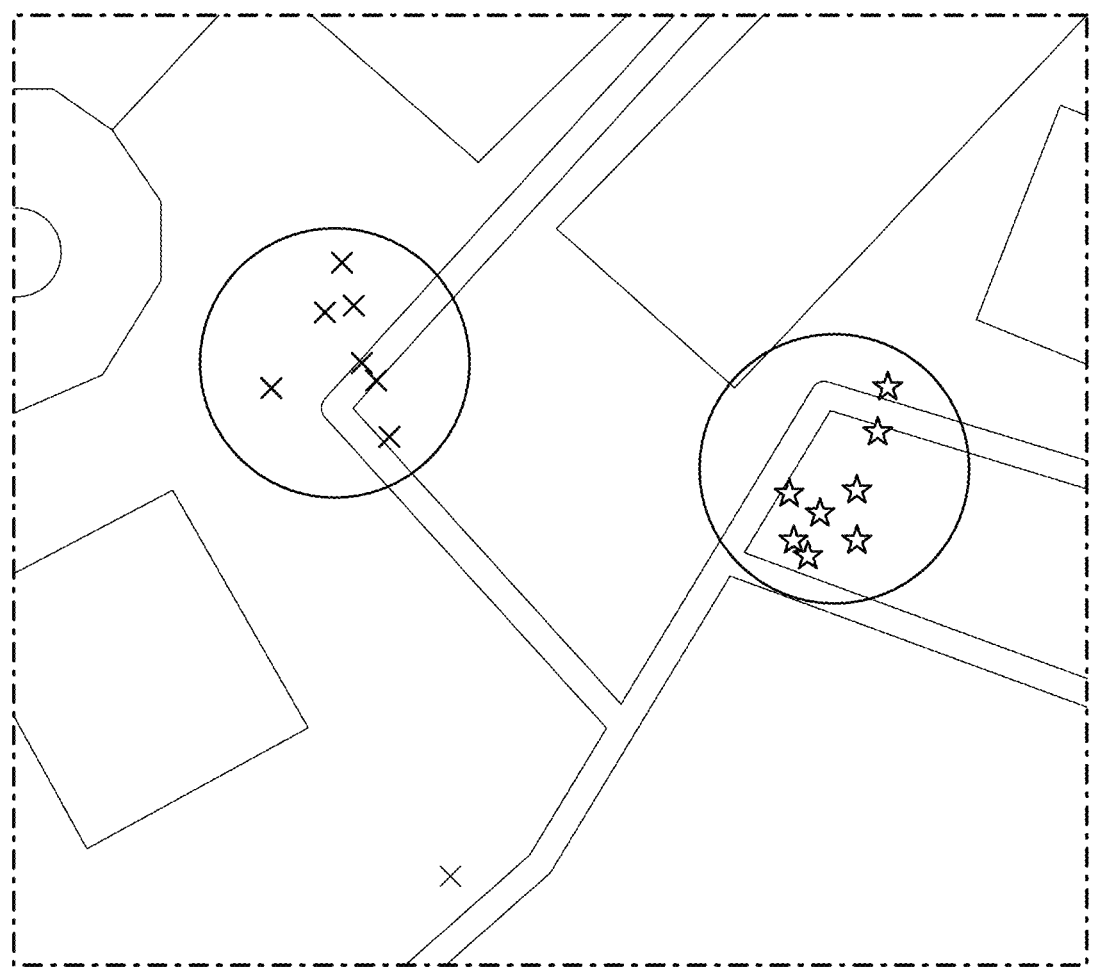
FIG. 3A is an image of locations of GPS pings from a vehicle for commercial customer service to determine stops (represented by groups of 'x' and groups of stars) according to embodiments of the present disclosure.
Figure 3B:
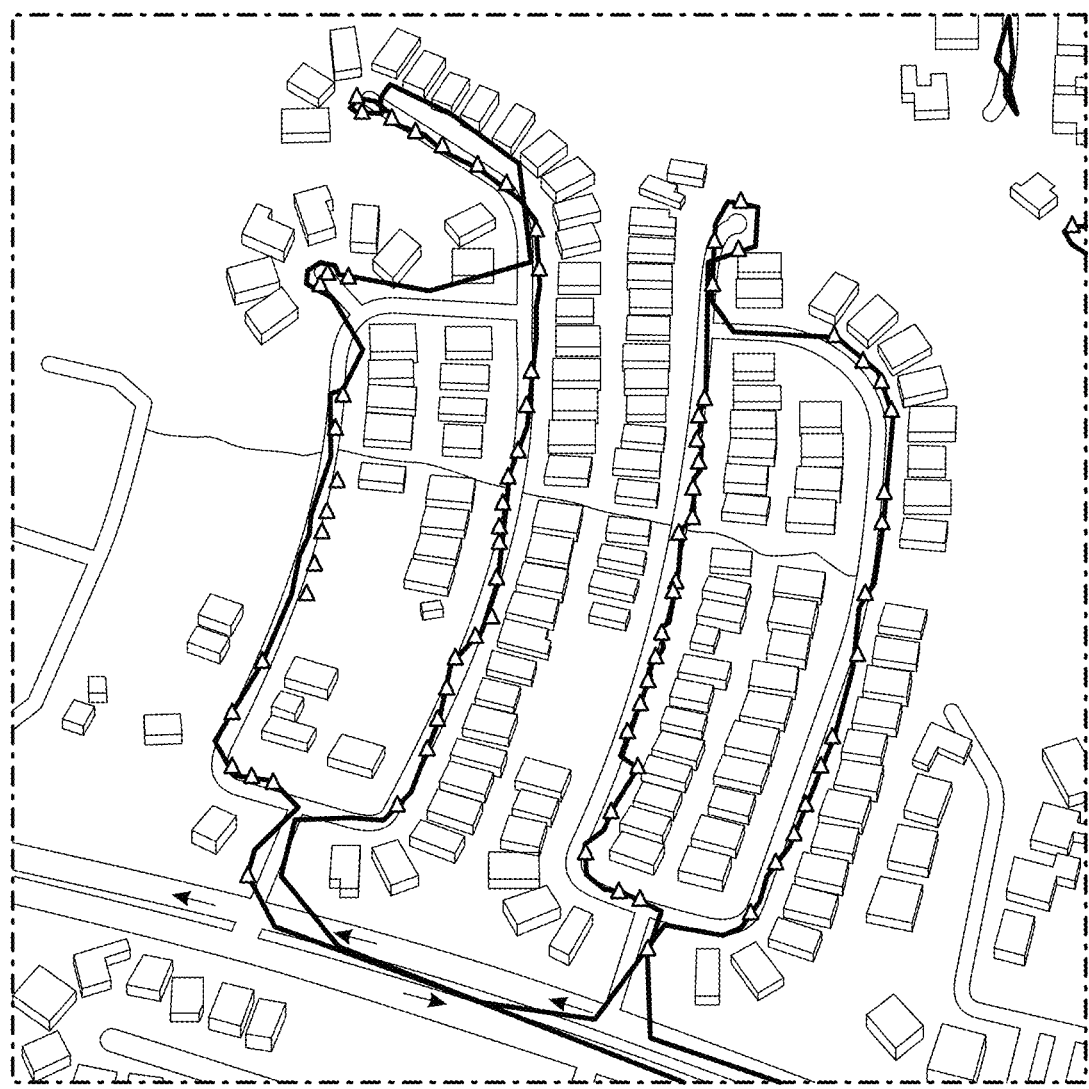
FIG. 3B is an image of locations of GPS pings from a vehicle for residential customer service to determine stops (triangles) according to embodiments of the present disclosure.

FIG. 3A shows locations of GPS pings for commercial customer service to determine a customer stop (represented by groups of 'x' and groups of stars), and FIG. 3B shows locations of GPS pings for residential customer service to determine a customer stop (represented by triangles). In certain illustrative embodiments, the sequence of GPS pings with two or more occurrences based on the movement of the vehicle where location (longitude/latitude) is the same, or within very small threshold of distance (fraction of foot) will be identified as a stop. This is appropriate in situations where the time to perform a service for a customer is sufficiently longer to enable capturing multiple GPS pings at the same location. This is typically applicable for servicing a waste/recycling customer in the commercial or industrial (roll off) lines of business where the time to service a stop is typically longer than performing service for residential customer service and the vehicle is stationary for a longer time relative to the residential customer service. As used herein, commercial can include industrial lines of business. However, the methodology can be utilized for residential stops as well, as appropriate under the circumstances.

Figure 4:
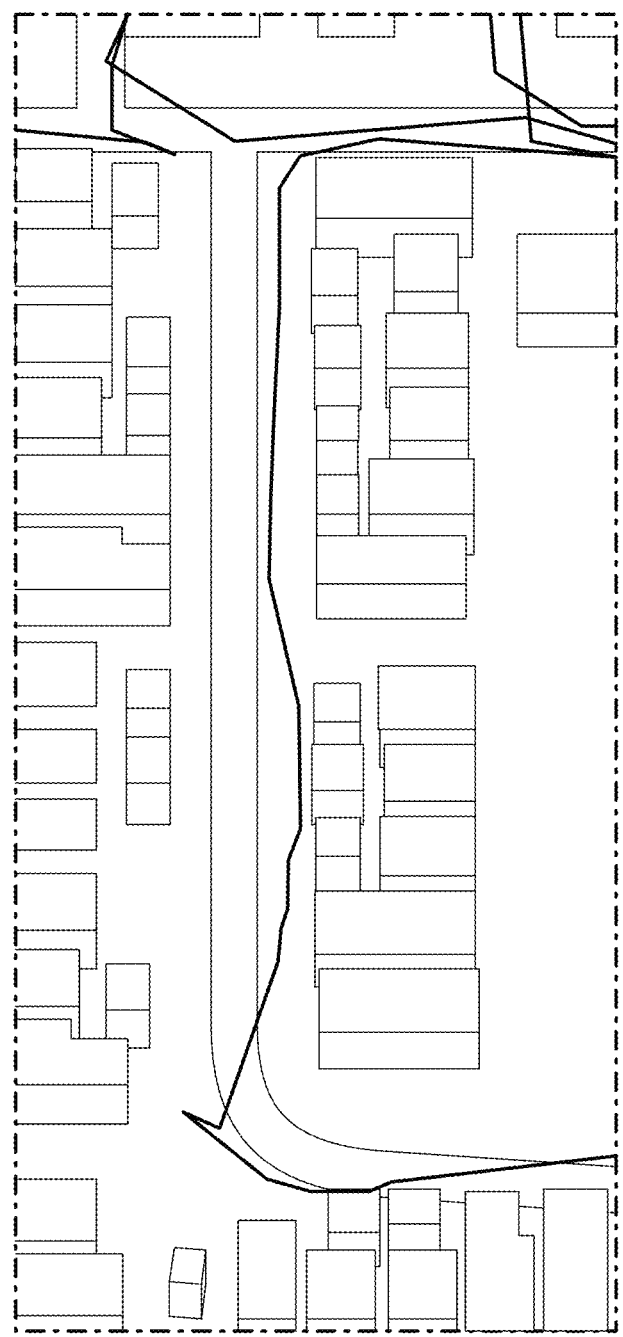
FIG. 4 is an image of a route trace based on locations of GPS pings from a vehicle for a residential route according to embodiments of the present disclosure.
Figure 5:
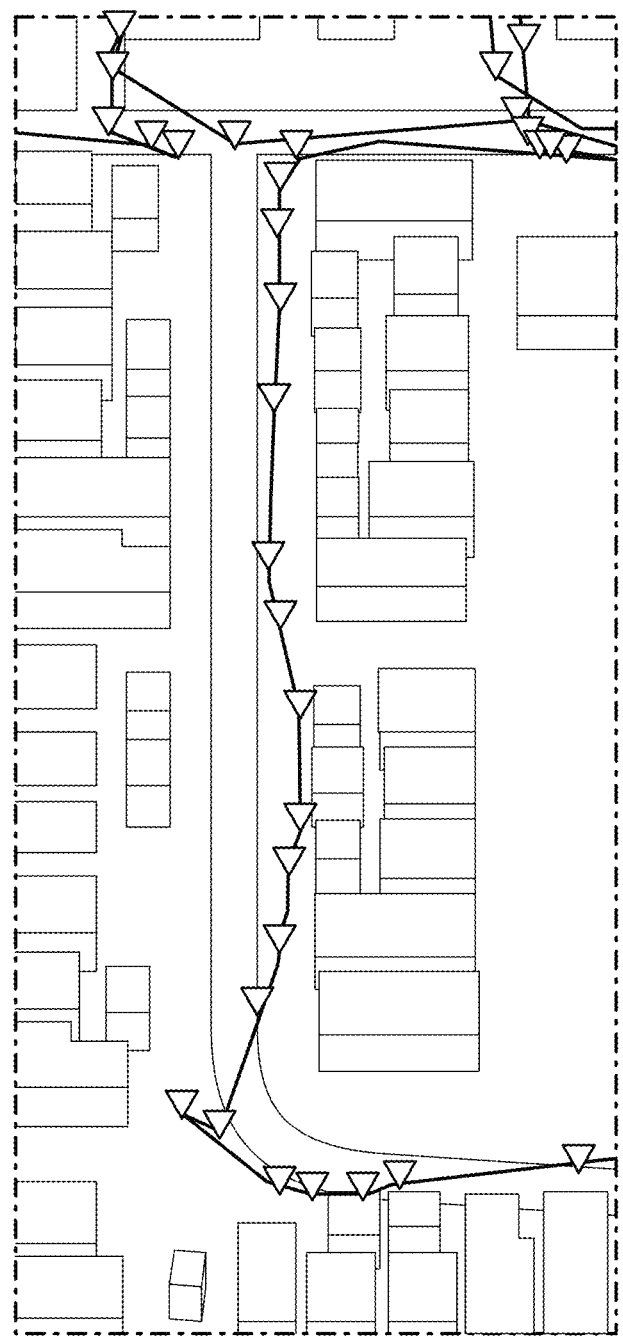
FIG. 5 is an image of stops or interpolated stops (triangles) based on GPS pings for areas of slow vehicle movement for a residential route according to embodiments of the present disclosure.
Figure 6:
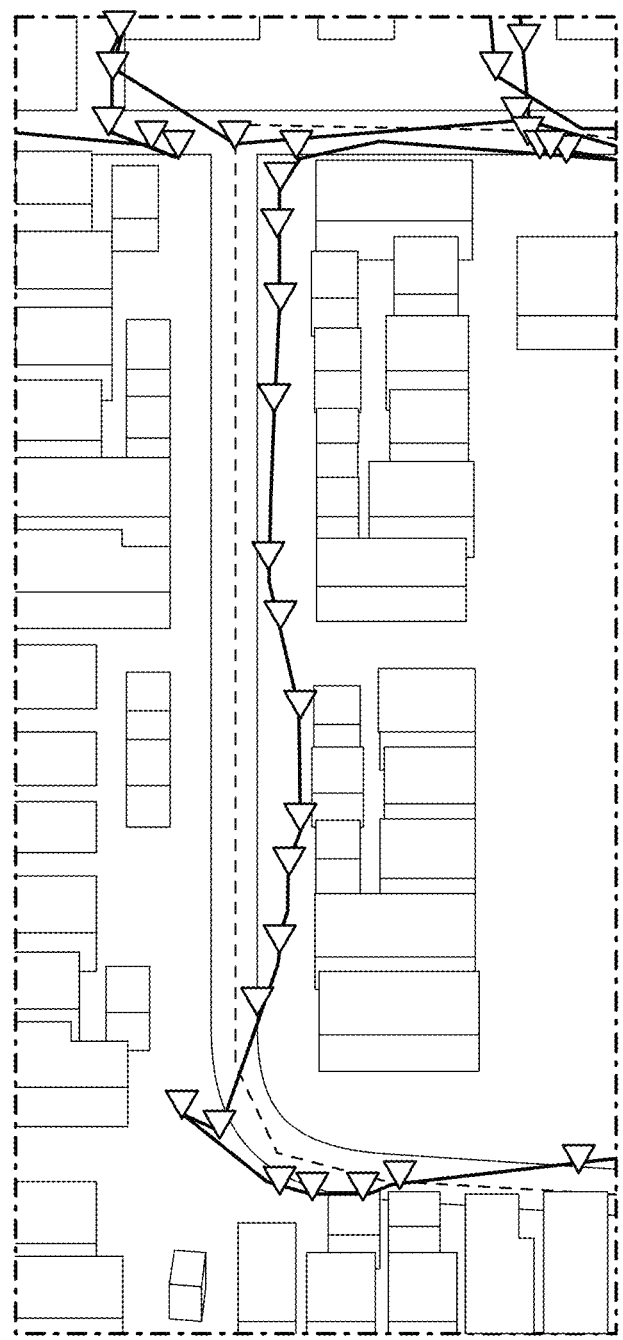
FIG. 6 is an image of a street network edge represented by a dashed line along with stops or interpolated stops based on GPS pings from a vehicle for a residential route according to embodiments of the present disclosure.

FIG. 4 shows a route trace, based on GPS pings from a vehicle, FIG. 5 shows triangles for interpolated stops on the route trace of FIG. 4, and FIG. 6 shows a dotted line for a street network edge associated with projected GPS pings on the image of FIG. 5. A sequence of two GPS pings where calculated speed between them is less than some small threshold (fraction of mi/hour) is identified as an interpolated stop. For example, an interpolated stop could be an area of slow vehicle movement of less than 0.5 mi/hour. This is appropriate in situations where the time to perform a service for a customer is shorter to enable capturing multiple GPS pings at the same location. This is typically applicable for servicing a customer in the residential line of business. Stops and interpolated stops represent the customer service location. However, the methodology can be utilized for commercial stops as well, as appropriate under the circumstances.

Figure 7:
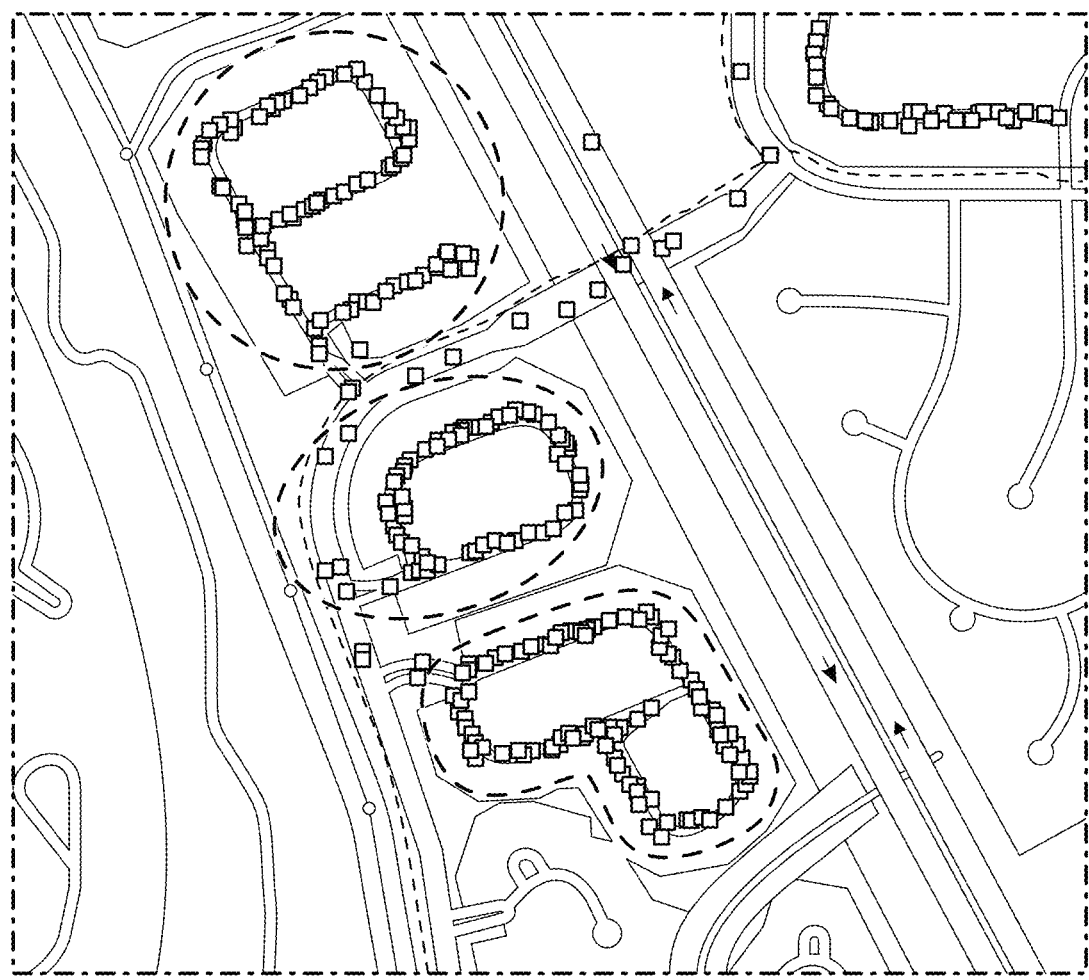
FIG. 7 is an image of detecting service area based on GPS pings wherein large areas enclosed within dashed lines represent areas with GPS pings where service is detected according to embodiments of the present disclosure.

FIG. 7 shows an example of a method of detecting customer service area. In certain illustrative embodiments, service areas (typically for servicing customers in residential lines of business) can be observed as areas with low (in the range of <0.5 miles an hour) average vehicle speed for significant amount of time (more than 1-3 minutes). Identifying these clusters of GPS pings associated with a slow moving vehicle can indicate that a particular service area is being serviced. Detecting service areas are useful to separate and distinguish the areas where the vehicles are traversing to reach customers to service from the areas where customers are actually being serviced.

Figure 8:
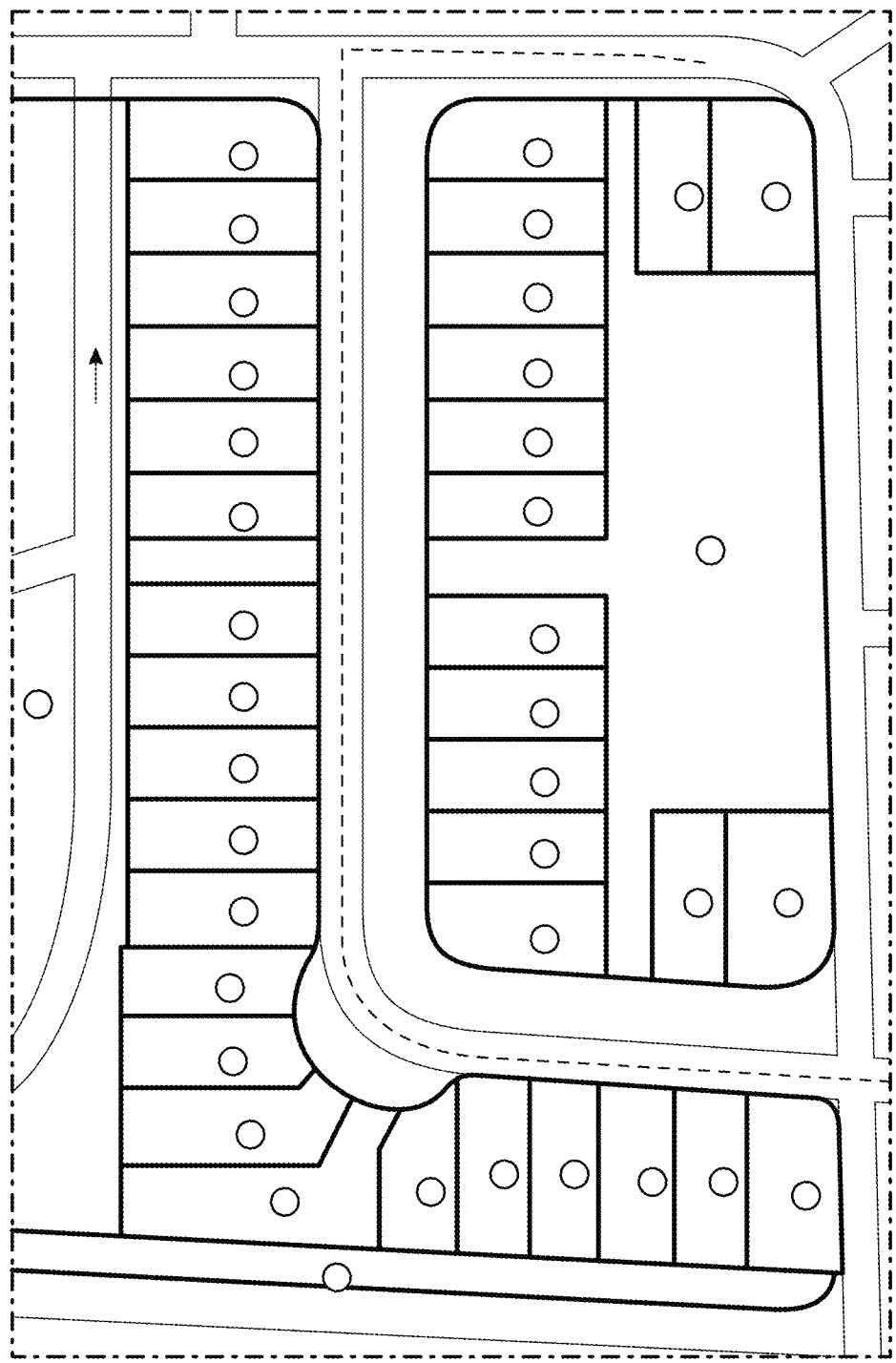
FIG. 8 is an image of examples of parcel boundaries (black lines) and parcel centroids (dots) according to embodiments of the present disclosure.

FIG. 8 shows examples of parcel data including parcel boundaries (black lines) and parcel centroids (circles). In certain illustrative embodiments, parcels data provides information such as owner name, address of the parcel, type of land use (residential or commercial use as an example) associated with parcel and geographic information such as the spatial geometry and property boundaries of the parcel and centroid of the parcel. Once a stop or interpolated stop is established, associated customer information can be derived from the parcels through a spatial search of parcels relative to the stop or interpolated stop. The association of parcel to the stop can be confirmed through the use of additional information from street network data and parcel data. Various properties can be identified from street network data such as unique identifier (street network) for the street, road type (street network), ranges of house numbers on left and right sides (street network), and edge geometry (street network). In addition, additional properties and information such as owner name, parcel address, parcel centroid location, property type and land use code associated with the parcels can be obtained from the parcel data. These additional properties from street network and parcels can help the confirmation of detecting customers from the stop or interpolated stop. This process can be repeated over multiple days of execution for the same route to establish the location of customer from multiple data points to establish and improve accuracy.

Figure 9:
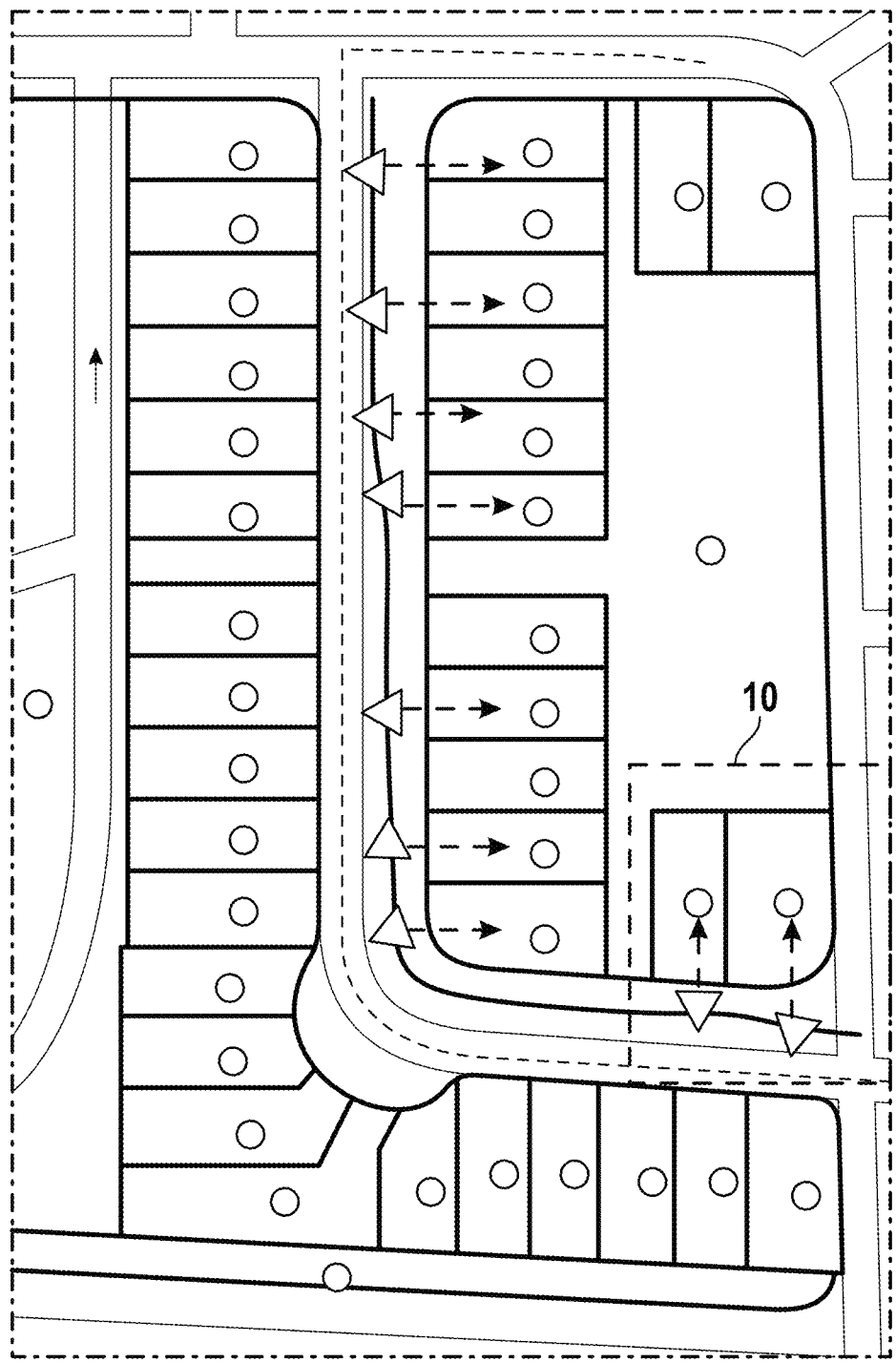
FIG. 9 is an image of examples of parcel boundaries (black lines) and parcel centroids (dots) along with stops or interpolated stops based on GPS pings from a vehicle for a residential route according to embodiments of the present disclosure.

FIG. 9 shows parcel boundaries projected to stops or interpolated stops based on GPS pings from a vehicle for a residential route. The triangles represent stops or interpolated stops from GPS pings on the route trace, and the arrows with dotted lines shows how parcels associated with stops or interpolated stops can be identified by doing a spatial search of parcels from stops or interpolated stop locations.

Figure 10:
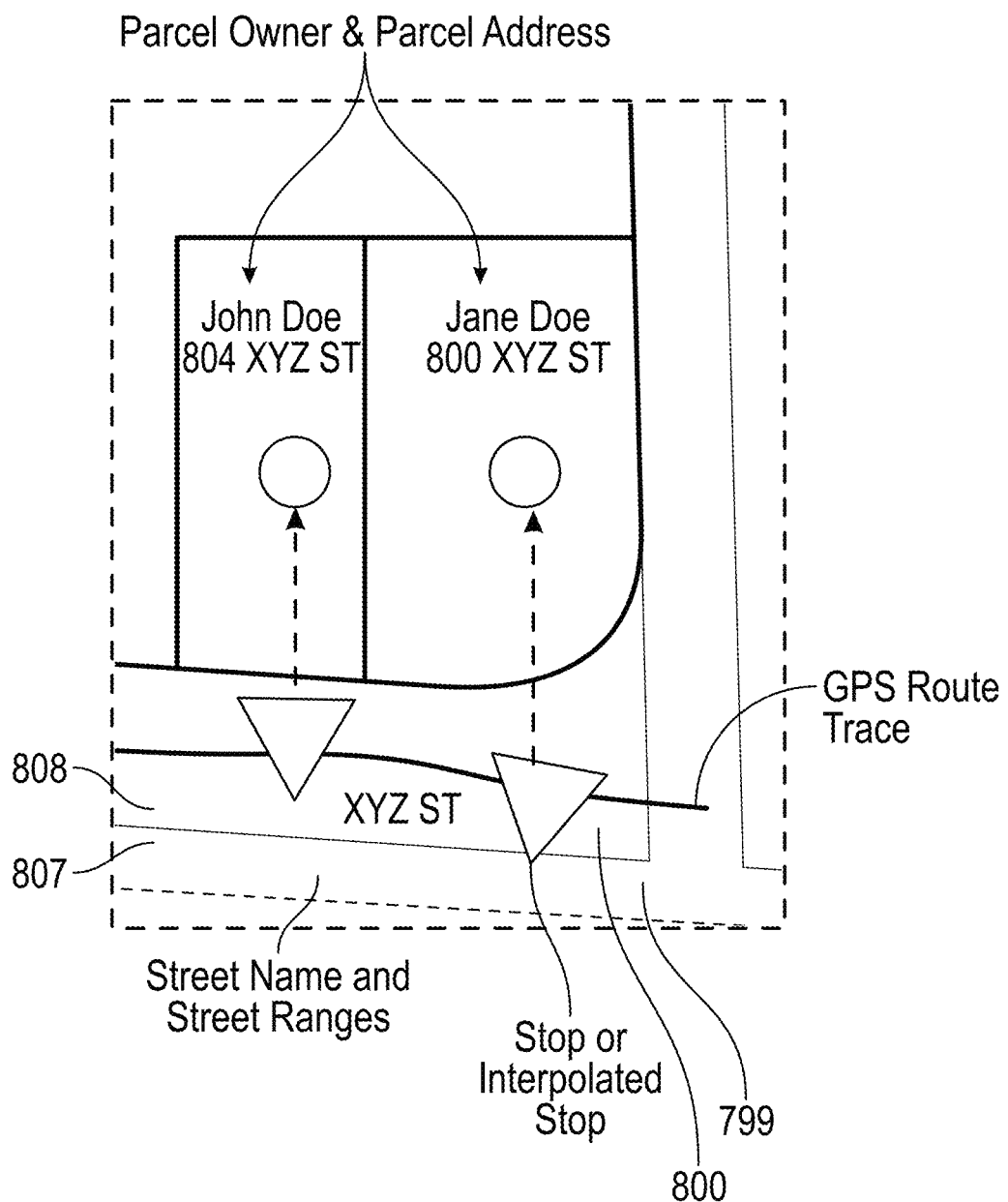
FIG. 10 is an image of examples of specific parcel boundaries (black lines) and parcel centroids (dots) to which stops or interpolated stops based on GPS pings from a vehicle are projected to derive customer information for a residential route according to embodiments of the present disclosure.

FIG. 10 is an exploded image of two specific parcel boundaries from FIG. 9. The stops and interpolated stops derived from GPS pings can be projected to parcels to derive customer information from the parcel. The customer information derived can include, for example, owner name, address, land use (commercial, residential), vacant or occupied etc. Black line represents a route trace from GPS pings, the triangles represent stops or interpolated stops from GPS pings and the arrows with dotted lines shows how parcels associated with stops or interpolated stops can be identified by doing a spatial search of parcels from the stops or interpolated stop locations. Gray line represents a segment of street network that represents XYZ street with the address ranges for the street. The even street address number range from 800 to 808 are shown on one side of XYZ street and the odd street address number range 799 to 807 are shown on the other side of XYZ street. The street network data also enables getting the length of the street segment for XYZ street for the address ranges above. In order to associate the stops and interpolate stops to parcels and derive the customer information from the parcels step 1: project the stops or interpolated stops to the street. Projecting enables getting the information such as street name, addresses range of the street, street type, side of street (even or odd address range side) direction of the street (one way, two way), and direction of travel of the truck from street network data. It will also enable estimating the street number corresponding to the stop interpolated from the side of street, street ranges and length of the segment. The triangle location representing stop is projected on to XYZ street and the street number is interpolated from street network based on the location of the stop relative to the length of the street segment and the side of the street (even or odd) the stop and interpolated stop is on. After step 1, stop will have street ranges (800 to 808 for even side of street), street number of XYZ street based on interpolation to the street network. In Step 2, the stop and interpolated stop are projected to the parcel through a spatial search and all parcels for the given street corresponding to the are identified. Spatial search for parcels could produce not only parcels which belong to a particular street, but also parcels which may be in close proximity to that street on both sides. For each Stop or Interpolated stop, find best match between the stop and parcels found through spatial search based on a matching algorithm. The matching algorithm utilizes information from parcels centroids, parcels boundaries, street ranges associated the street the stop is projected to, interpolated street number for the stop, direction of travel (for even or odd side of street determination) to validate and associate the best matching parcel to the stop. Based on the identified parcel for the stop, information such as parcel address, parcel owner etc. is used to derive the customer name, address and land use associated with the parcel.

Figure 11:
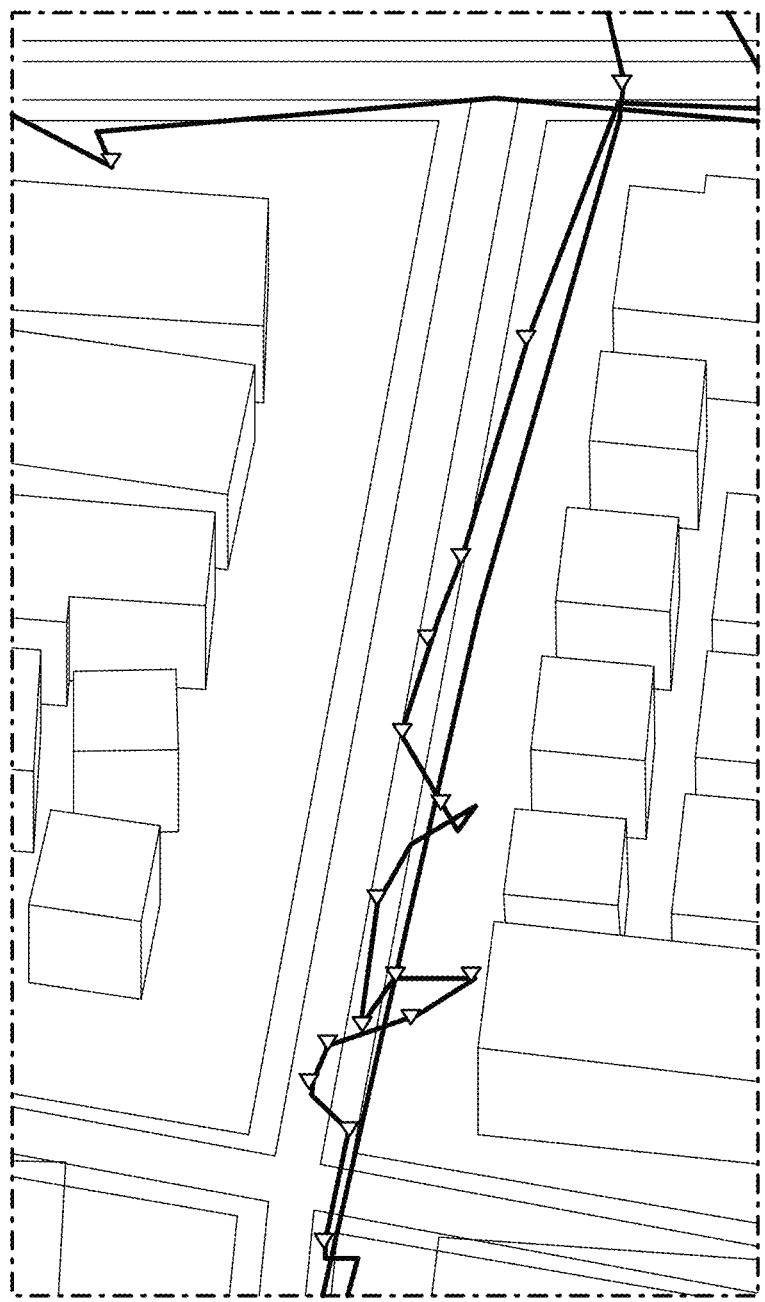
FIG. 11 is an image of residential services for a collection route GPS trace based on connecting GPS ping locations with both (right and left) sides of street pick up with stops or interpolated stops represented by triangles according to embodiments of the present disclosure.
Figure 12:
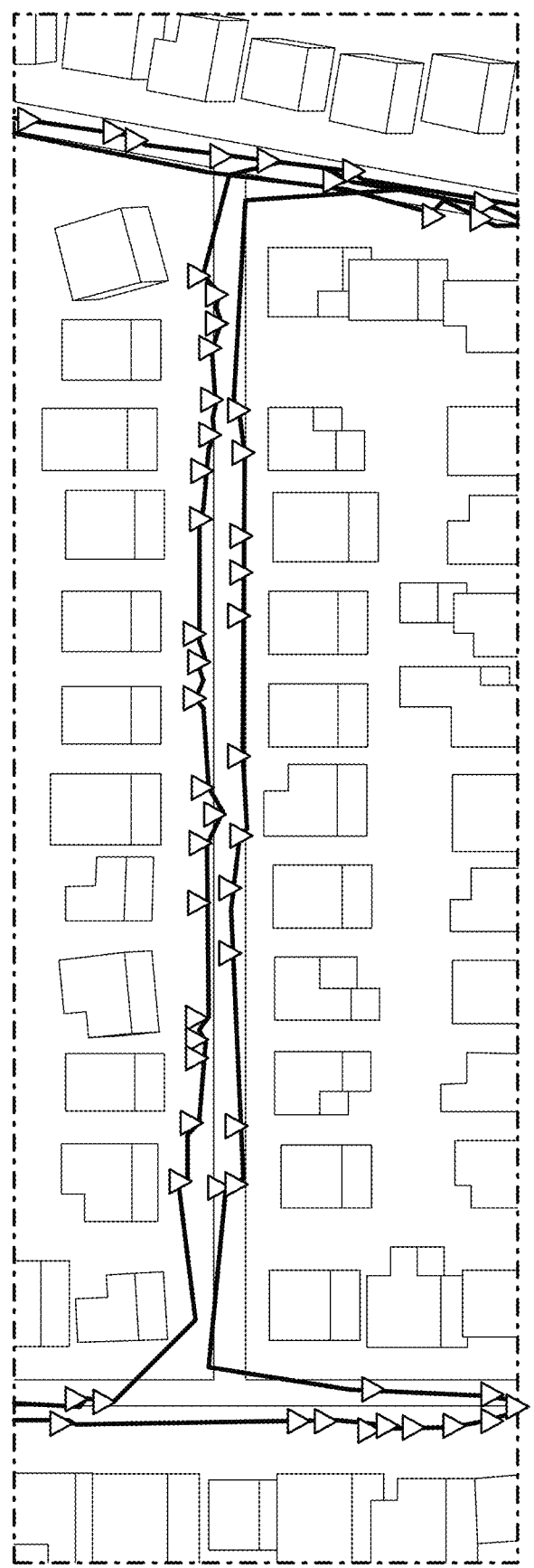
FIG. 12 is an image of residential services for a collection route GPS trace based on connecting GPS ping locations with one (right) side of street pick up using automated side loading waste services vehicles with stops or interpolated stops represented by triangles according to embodiments of the present disclosure.

FIG. 11 shows an example of a residential services garbage collection route with GPS trace and both sides of street pick up, and FIG. 12 shows an example of a residential services garbage collection route with GPS trace and one (right) side of street pick up using an automated side loader (ASL) vehicle. In certain illustrative embodiments, when a waste or recycling service is performed at a customer location, the sequence of activities during the service usually includes one or more of: approach of vehicle to the container area containing the material to be picked up (trash or recycle); vehicle making a stop; transfer of material from container to the vehicle (or replacement of full container with empty one); and vehicle leaving the container area. During the step of transferring material from container to the vehicle, the service location and time might not have a corresponding GPS ping (or stop, i.e., group of GPS pings) that can be gathered from the vehicle, which exactly match geographical position (latitude, longitude) of a container and time of service. In certain illustrative embodiments, the closest GPS ping (or stop) associated with the time and geographical position of material transfer can be identified as the container location. This can be identified by the corresponding stop location or interpolated stop location. This process can be repeated over multiple days of execution for the same route to establish the location of container from multiple data points to establish and improve accuracy.

In certain illustrative embodiments, the presently disclosed system and method can increase the opportunity for accurate waste collection service area detection at a customer using different sources of data. A primary source of telemetry is the stream of GPS pings associated with GPS enabled equipment (on the collection vehicle). Stops and interpolated stops are derivatives identified from the GPS pings data stream. Customer service could happen at a stop or interpolated stop. Service could happen at a service area. Service for residential customer(s) should be in close proximity to a customer's parcel. The following are examples of the optional data elements that can be used if available. In order to improve the accuracy of positive customer service detection, data from multiple sources as well as multiple occurrences of data over long period of time can be used. A first optional data element in addition to GPS data are manual driver performed events collected from the OBU on the service vehicle. A second optional data element in addition to GPS are events associated with a sensor on the vehicle (if equipped) to aid in the detection of customer service.

In FIG. 11, the class of routes with both sides of street residential service or pick up could be characterized by the following features: Large number of areas where the vehicle slows down; duration of such slowdowns is low (10-20 seconds); and the vehicle travels that stretch of road once for service, and if it travels twice, on the way back there are no vehicle slowdowns for service. In FIG. 12, the class of routes with one side of street residential service or pick up could be characterized by the following features: large number of areas where the vehicle slows down; duration of such slowdowns is low (10-20 seconds); and if the vehicle travels this stretch of road in both directions for service, there are slowdowns on both directions of travel for performing service.

Figure 13:
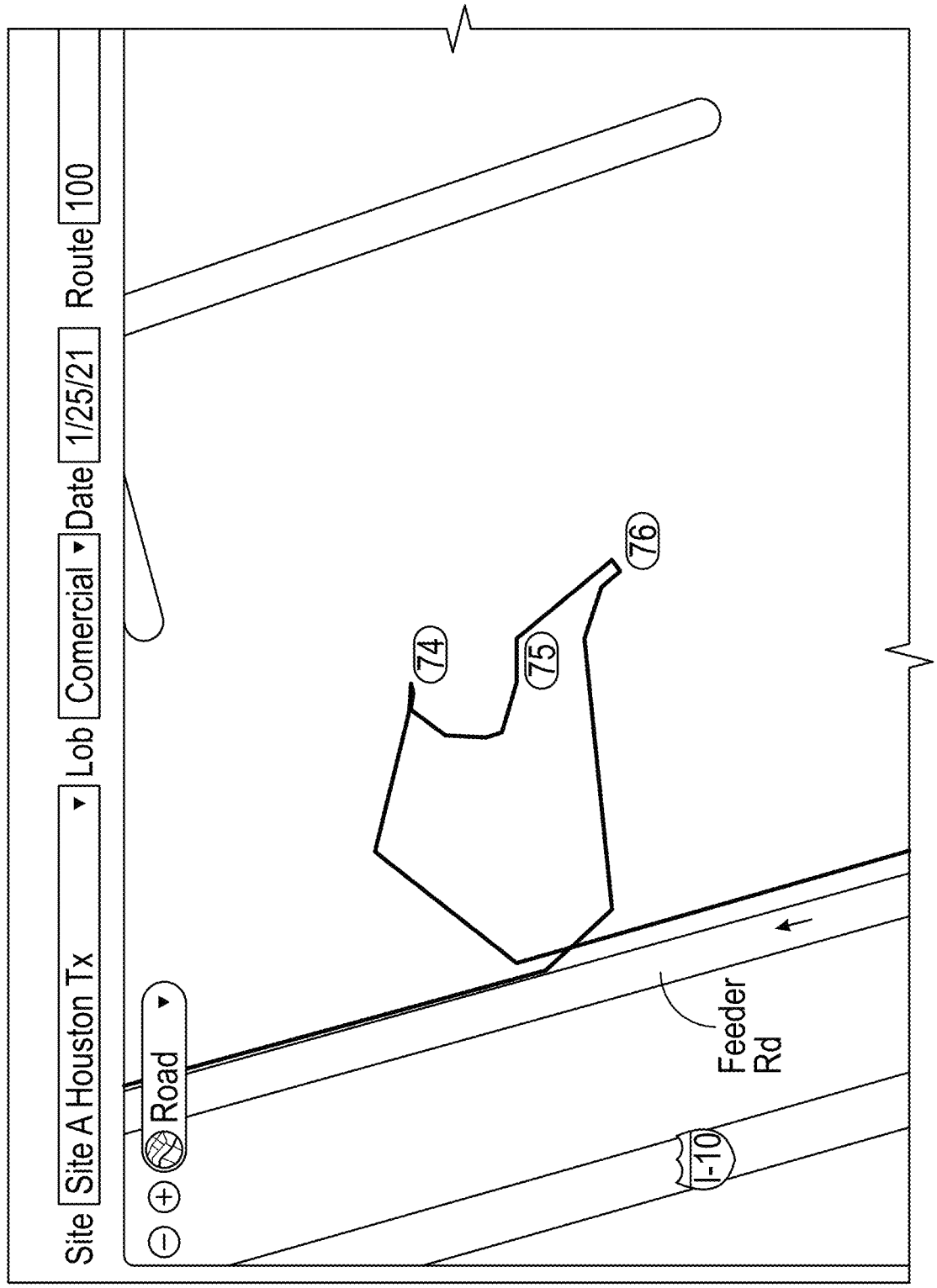
FIG. 13 is an image of customers' locations for a commercial route represented by an oval and a stop number inside based on manual driver punches on an onboard unit according to embodiments of the present disclosure.

FIG. 13 shows an example of indicators of customers' locations represented by an oval and a stop number inside for a commercial route based on manual driver punches on an onboard unit (OBU).

In certain illustrative embodiments, the presently disclosed system and method can allow for discovery of customers based on GPS analysis for the residential line of business. Sources for analysis can include: GPS pings for a garbage collection route; street network; parcels network; and customer account (optionally if available). In certain illustrative embodiments, discovering of customers for a residential line of business can include the following steps. First, project GPS pings to street network. As a result, each GPS ping will be associated with a street segment, which has one or more of the following properties: street name, longitude/latitude of projected location; % along (0—projected to start of a street segment, 100—projected to end of street segment) the street segment; distance from the GPS ping to projection's location, street type (for example. highway, local street etc., and side of street (left or right). Second, combine GPS pings into stops (where two or more consecutive in the time GPS pings have the same geographical position (latitude and longitude)). For residential service, because of the small amount of time for duration of service, instead of exact stops only, stops can also be detected in areas of slow vehicle movement (less than 0.5 mi/hour) through interpolation, and these stops will be referenced herein as interpolated stops. Third, detect service area. This is the area with low average speed for a significant amount of time (more than 1-3 minutes). Fourth, detect the closest parcel for each stop (or interpolated stop) based on a spatial search from the stop to the parcel in a service area. A positively identified customer should have a stop and a parcel association and association with customer account. Address and associated information can be derived from parcel data for the customer to compare against the customer account. When the exact geographical position of a container location from GPS data cannot be established, the closest GPS ping (of stop or interpolated stop) associated with time and geographical position of material transfer from container to vehicle can be used to identify the container location. Once the association of a stop with parcel, service area, and customer account are established, properties of the stop or interpolated stop (geographical location, time) can be used as container location. This process can be repeated over multiple days of execution for the same route to establish the location from multiple data points to establish and improve accuracy In certain illustrative embodiments, the presently disclosed system and method can also allow for discovery of customers based on GPS analysis for the commercial line of business. Sources for analysis can include: GPS pings for a garbage collection route, street network, and customer accounts if available. In certain illustrative embodiments, the on-board unit (OBU) could be additional source for doing container or customer discovery. The OBU could provide manually generated events such as arrive customer, depart customer and service completion by the driver. The manually generated events can potentially be error prone and can be used as additional information to augment or combined with GPS derived information.

In certain illustrative embodiments, there are two subcases for discovery of customers and/or containers based on GPS analysis for the commercial line of business: The first subcase is where container(s) location is inside and on customer property and has container location, entry location for a property, and exit location for a property; and the second subcase is where the container is on or near the street curb outside property.

In the first subcase, where the container is on property, the discovering of customers for the commercial line of business can include the following steps: Step 1: Project GPS pings locations to street network; Step 2: Combine GPS pings into stops where two or more consecutive-in-time GPS pings have the same geographical position (latitude and longitude)); Step 3: Combine the out of street GPS pings into groups. GPS pings that are projected to the street network and more than a threshold distance (50 feet) from the street network will be classified as "out of street" pings. Step 4: Associate stops in Step 2 with out of street groups in Step 3; Step 5: Detect the customer associated with the stops by interpolating based on the street network or from the closest parcel based on spatial search from the stop. Optionally, validate results obtained from parcel for address and owner name with the customer account or information on the OBU and OBU events if available. Address and associated information can be derived from parcel data for the customer to compare against the customer account; Step 6: Stops, from Step 4, can be represented as container(s) locations. The positively identified container has customer, address and container location associated with it. If the optional OBU data is used, it can be associated with a customer account as well. This process can be repeated over multiple days of execution for the same route to establish the location from multiple data points to establish and improve accuracy In the second subcase, where the container is outside the property and close to the street, discovering of customers for a commercial line of business include the following steps: Step 1: Project GPS pings to street network; Step 2: Combine GPS pings into stops; Step 3: Associate stops with street network segments; Step 3: Detect customer associated with the stops by interpolating based on the street network or from the closest parcel. Optionally, Validate result with the customer account on the OBU and OBU events if available. Address and associated information can be derived from parcel data for the customer to compare against the customer account; Step 4: Stops associated with street segments can be represented as container locations. The positively identified container has customer account, address and container location. In certain illustrative embodiments, the presently disclosed system and method can be extended beyond discovery of customers and/or containers to include other elements of waste and/or recycling services for commercial, residential and roll off lines of business that are instrumental to enabling routing efficiencies. These can include, for example, entry locations to customer property for service, exit locations from property after service, time spent on customer property for travel and service, and/or distance travelled on customer property before and after service. Discovery of the above elements enables determination of important segments of a route that can improve route planning and generating routing efficiencies. These route segments can include travel and service segments and their associated properties such as start time and end time for each of the segments. During a typical workday, multiple travel and service segments occur on a route, and these segments follow one another.

Large customer properties such as shopping malls, universities, and schools in the commercial line of business may have multiple points of entry or exits. Knowing these entry and exit locations enables a user to develop accurate estimates of travel times on the property and create proper sequences of stops on the route, as well as provide driving instructions to service the customer.

Figure 14:
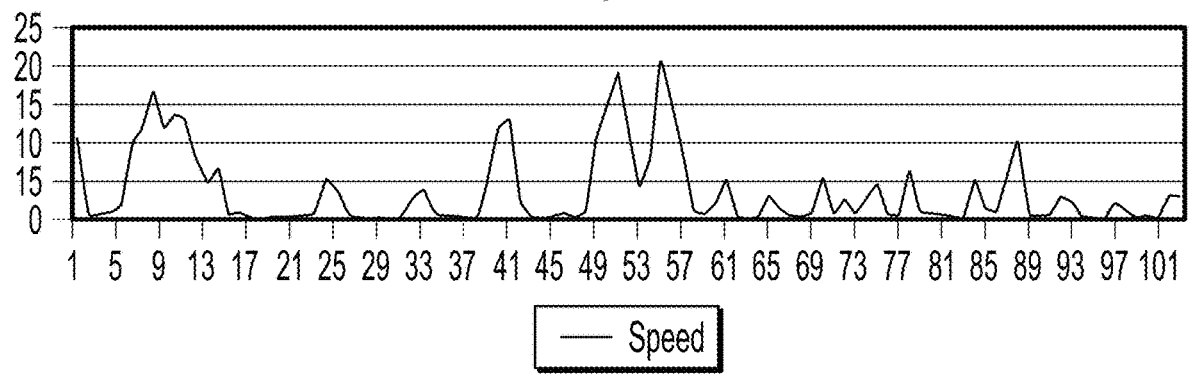
FIG. 14 is a plot of speed for a service segment according to embodiments of the present disclosure.

FIG. 14 shows a plot of speed for a service segment according to certain illustrative embodiments. Relatively small average speed (less than a few miles per hour) and multiple stops are characteristics of a service segment of a route for the residential line of business. Technically, this is a combination of travel segments with low average speed and stops. The service segment of a route can be defined by the duration or time when the vehicle is stationary at customer locations and executes customer services such as picking up the waste or recycle containers to dump material into the vehicle. The service segment of a route can also include the duration of time at a landfill or a transfer station where the vehicle is dumping the material.

Figure 15:
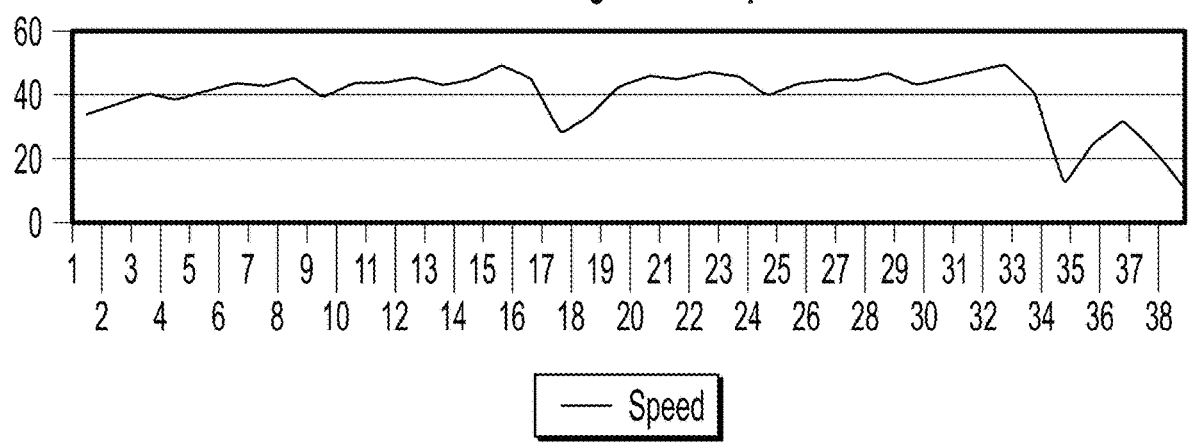
FIG. 15 is a plot of speed for a travel segment according to embodiments of the present disclosure.

FIG. 15 shows a plot of speed for a travel segment according to certain illustrative embodiments. This example is defined by steady speed of the service vehicle for a long period of time and is one characteristic of a travel segment of a route. The travel segment of a route can be defined by the duration when vehicle travels without executing customer services or services at facilities such as landfills or transfer stations. The travel segment of a route can occur on different types of streets. There are two primary types of streets: named or public streets, and unnamed or private streets. Named or public streets are well known streets and roads and can typically found in the street network, while unnamed or private streets may not always be found in the street network. Examples of unnamed or private streets can include alleys, the internal roads in large properties like industrial plants, shopping malls, different type of campuses such as universities, and other types of large communities with internal roads.

Figure 16:
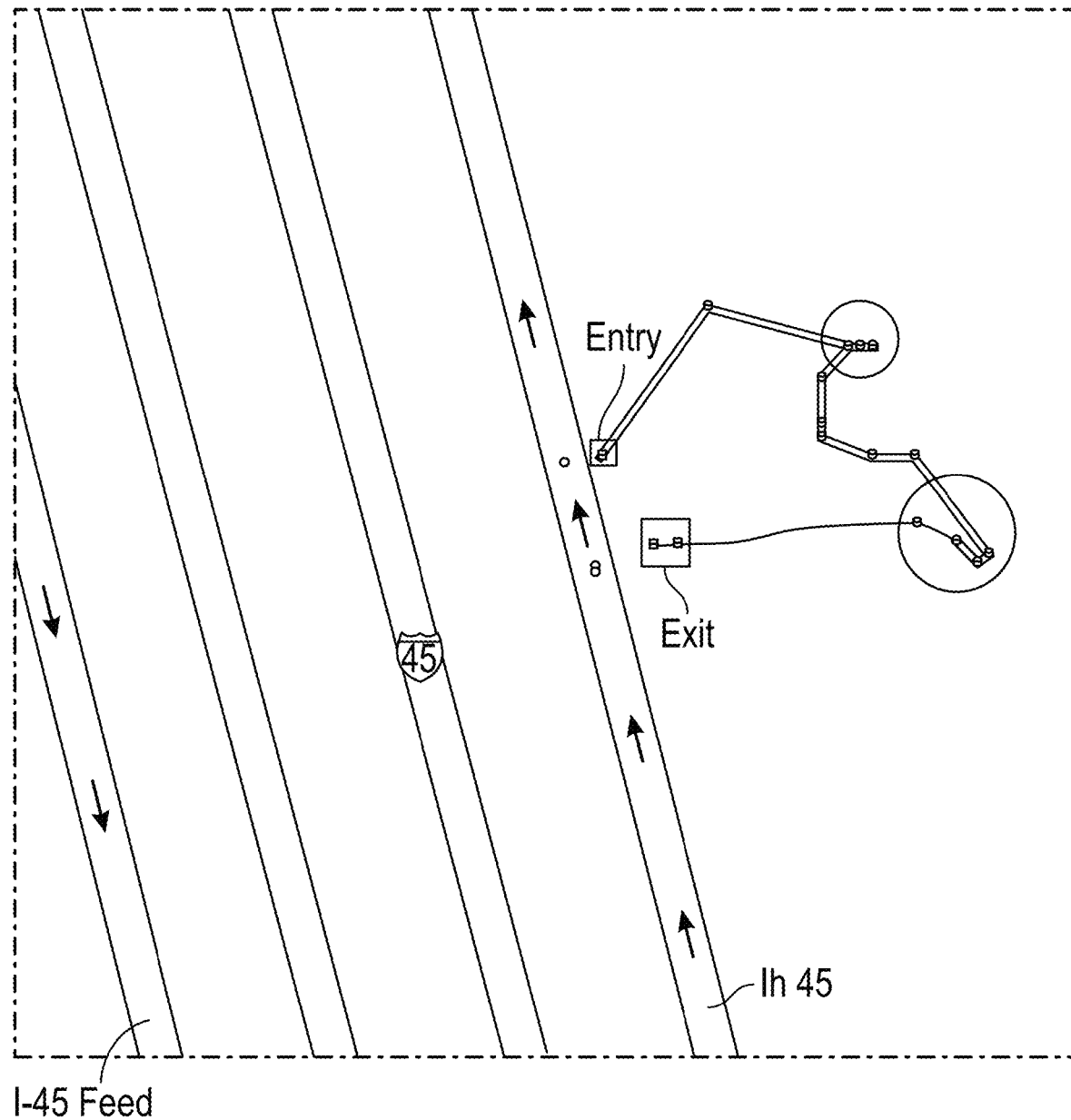
FIG. 16 is a determination of entry and exit locations for customers in a commercial line of business according to embodiments of the present disclosure.

FIG. 16 shows a determination of entry and exit locations for customers in a commercial line of business, according to certain illustrative embodiments. A process for determining entry and exit locations for a customer in the commercial line of business can be utilized. In certain illustrative embodiments, the process can include the following steps. First, project GPS pings to the street network. Second, determine stops based on the GPS pings. Third, associate the stops with the street network segments. Fourth, group the street segments for private roads and alleys. Fifth, detect the location where the service vehicle left the public road and entered the private road based on the analysis of GPS pings from the service vehicle in relation to the street network. This location would be the entry point for the customer property. Sixth, detect the location when the service vehicle left the private road and entered the public road based on the analysis of GPS pings in relation to the street network. This would be the exit location of the customer property. This process can be repeated with data from the same route from multiple days for the same customer to establish accuracy. Optionally, if the service vehicle is equipped with an onboard unit (OBU), the detected locations can be validated with OBU events if available.

In certain illustrative embodiments, a process for discovering on property travel time and service times for the commercial line of business can also be utilized. The process can include the following steps. First, project GPS pings to the street network. Second, determine stops based on the GPS pings. Third, associate the stops with street network segments. Fourth, group the street segments for private roads and alleys. Fifth, detect the location where the service vehicle left the public road and enter the private road (or alley) based on the analysis of GPS pings from the service vehicle in relation to the street network. This would be the entry point for the customer property. Sixth, detect the location where the service vehicle left the private road segment (or alley) and entered the public road based on the analysis of GPS pings in relation to the street network. That would be the exit location of the customer property. The period of time between when the service vehicle entered the property and when it left the property minus the amount of time the service vehicle spent servicing the customer container based on stationary areas associated with the customer service (as described below) would be the on property travel time. This process can be repeated with data from the same route from multiple days for the same customer to establish accuracy. Optionally, if the service vehicle is equipped with an onboard unit (OBU), the detected locations can be validated with OBU events if available.

In certain illustrative embodiments, once the potential service area of a route is detected, travel distance and duration can be calculated in addition to determining customer entry and exit points. An additional step that can be performed as part of the analysis is to search for stationary areas for a service vehicle on a route. A stationary area can be defined as a geographical location where the service vehicle does not display significant movement for a period of time. Stationary area can be determined by GPS pings and the time stamps associated with the GPS pings. Stationary areas could be associated with multiple events on a route as well. These can include, for example, traffic stops, or idle times on a route where the service vehicle is involved in one or more of: idling; while performing customer service; at a vehicle depot; at a landfill; or during the lunch time for a driver on a route.

In certain illustrative embodiments, the process of discovering entry and exit locations for the customer property for residential customers can be very similar to the process for determining locations for commercial customers. In addition, the process can also be extended to groups of residential customers beyond individual customers. This can be useful for determining and associating travel and service times on a route for residential neighborhoods.

In certain illustrative embodiments, the process for discovering on property travel time and customer on property service times for residential customers can be very similar to the discovery process for commercial customers. In addition, the process can also be extended to groups of residential customers beyond individual customers. This can be useful for determining and associating travel and service times on a route for residential neighborhoods.

Figure 17:
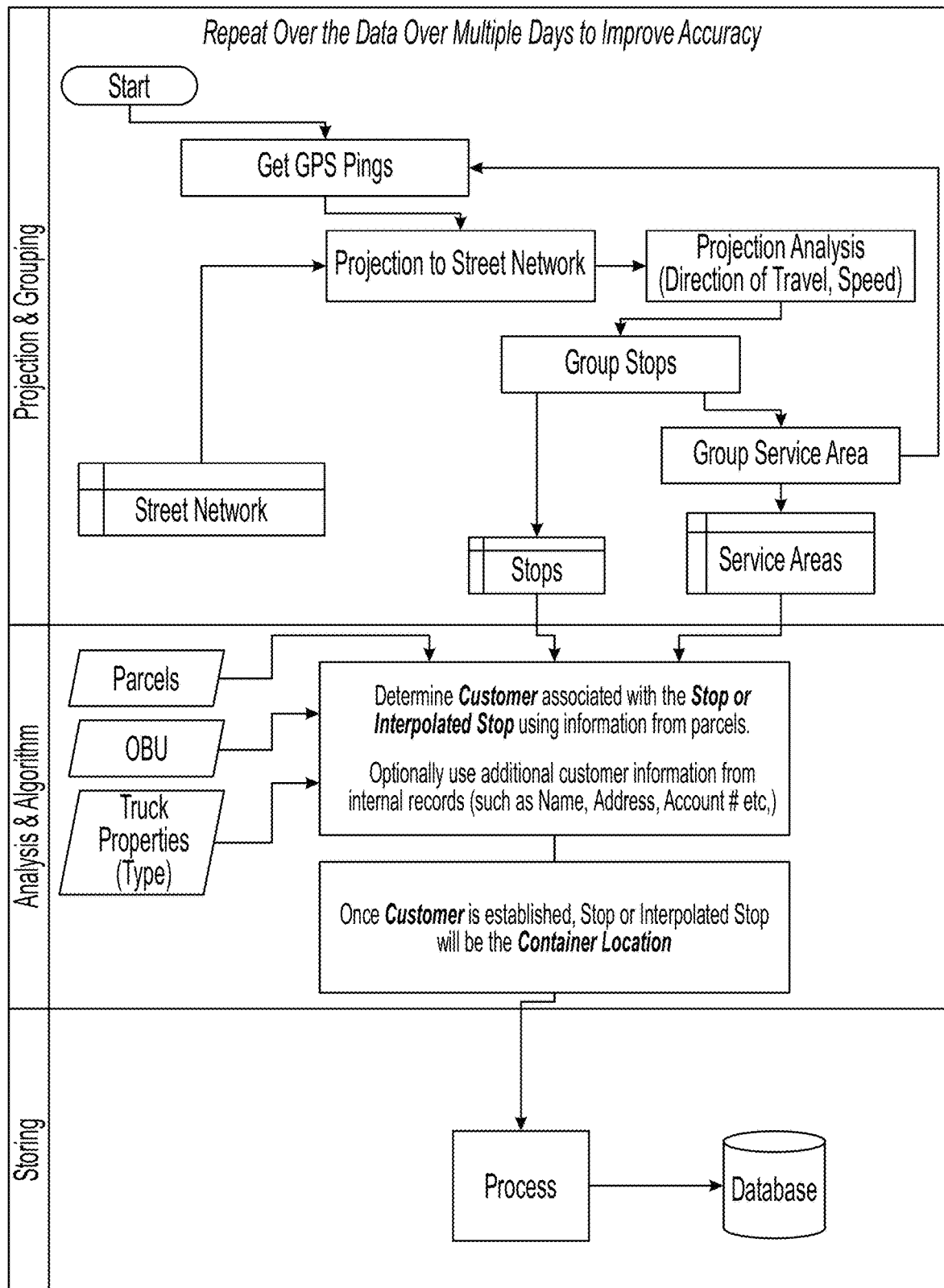
FIG. 17 is an image of a process flow for enabling customer and container discovery according to embodiments of the present disclosure.

FIG. 17 shows an illustrative embodiment of a process flow diagram for enabling customer and/or container discovery. FIG. 17 herein illustrates exemplary methods with a plurality of sequential, non-sequential, or sequence independent "steps" as described herein. It should be noted that the methods of FIG. 17 are exemplary and may be performed in different orders and/or sequences as dictated or described herein, and any alternative embodiments thereof. Numerous arrangements of the various "steps" can be utilized. In addition, not all "steps" described herein need be utilized in all embodiments. However, it should be noted that certain particular arrangements of "steps" for the methods described herein are materially distinguishable from and provide distinct advantages over previously known technologies.

The presently disclosed system and method have a number of advantages. For example, this method relies primarily on GPS ping data based on vehicle movement to determine customer and/or container locations. Special adjustments to vehicles or modifications based on sensors, cameras etc. to vehicles are not needed using this method, in certain illustrative embodiments. In addition, special adjustments or modifications to containers such as telemetry, cameras are also not needed using this method, in certain illustrative embodiments. With the advent of cheaper GPS devices and cellular data costs, the GPS based approach outlined herein can be less expensive compared to other options.

The presently disclosed system and method can be incorporated into the functional operations of the service vehicles, to communicate and provide routing, optimization and other operational information to vehicle drivers and workers regarding waste/recycling collection and delivery routes. This can occur prior to beginning operations and/or on an ongoing, real time basis. As a result, the disclosed subject matter has a variety of practical applications, as well as provides solutions to a number of technological and business problems of the prior art.

Service vehicles used in the waste collection, delivery, disposal and recycling industry often have on-board computers (OBUs), location devices and interior and exterior safety and non-safety related cameras installed on the exterior and interior thereof. These devices can provide waste services providers and their field managers with information related to the service vehicle, location of the service vehicle, service confirmation, customer service issues, service routing issues, customer site information and safety issues and concerns, as well as provide vehicle drivers and workers with information relating to collection and delivery routes.

Figure 18:
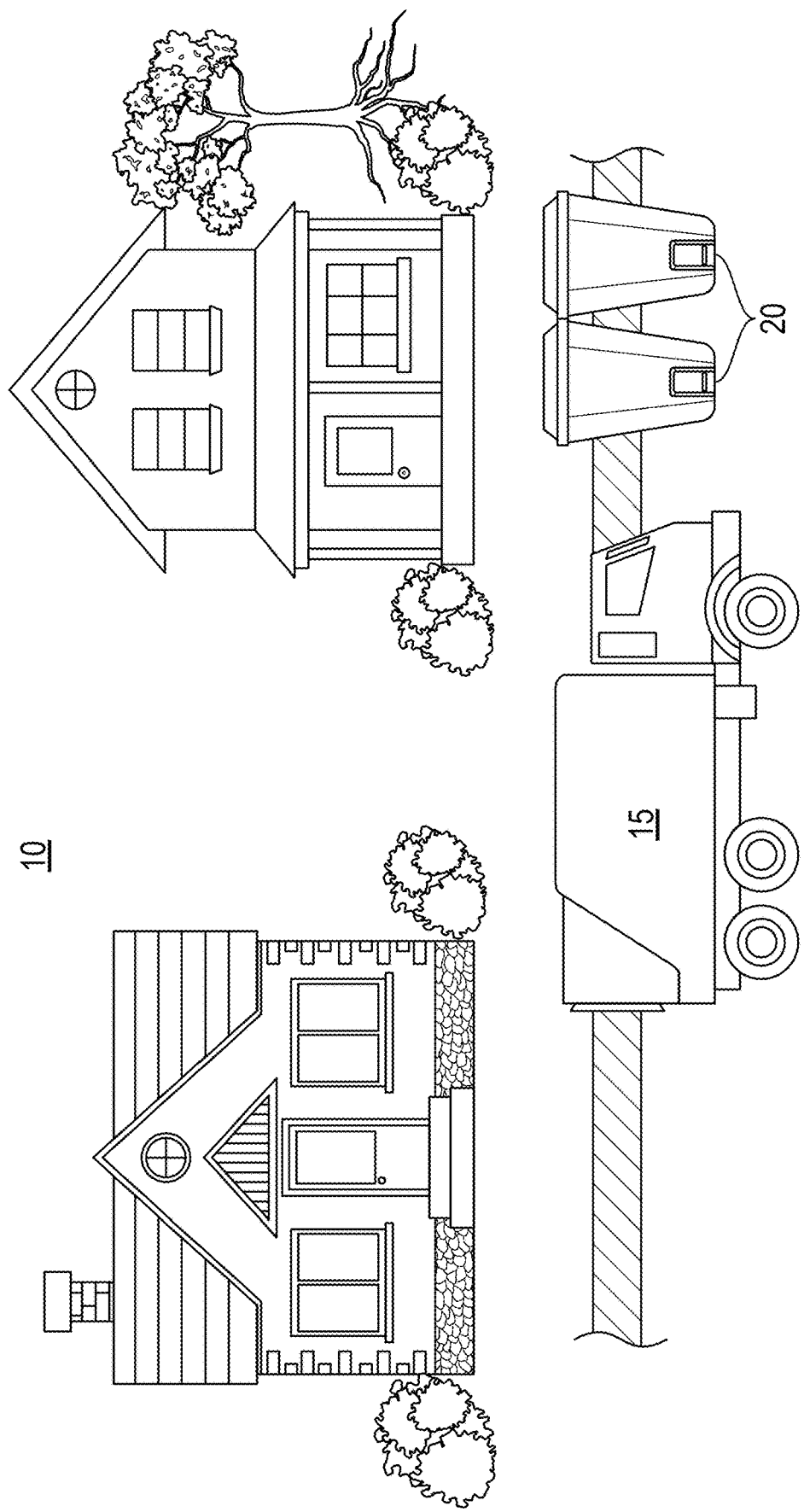
FIG. 18 is a representative examples of a residential waste services environment to be serviced by a waste service vehicle according to embodiments of the present disclosure.

For example, FIG. 18 is an example of a services environment 10 where the presently disclosed system and method can be utilized. A service vehicle 15 is configured to provide services to customers, which can include typical lines of waste industry services such as waste collection and transport and/or recycling for commercial, residential and/or industrial. Service vehicle 15 collects waste or recyclables from a plurality of containers 20 which will typically be assigned to, or associated with, specific customers registered to a waste collection company. The presently disclosed system and method can be incorporated into the functional operations of service vehicle 15, to communicate and provide routing, optimization and other operational information to vehicle drivers and workers regarding waste/recycling collection and delivery routes, either prior to beginning operations and/or on an ongoing, real time basis.

Figure 19:
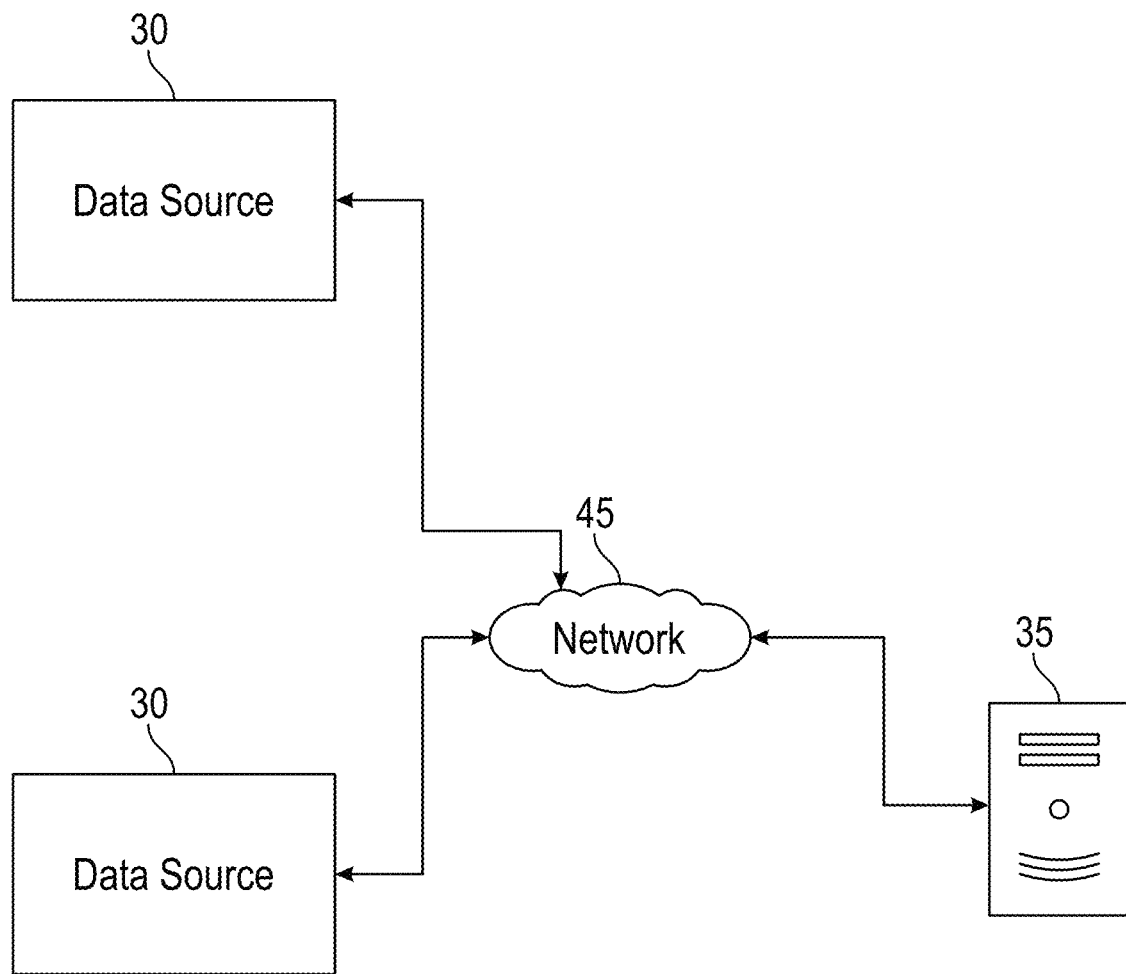
FIG. 19 is a system for data collection and sharing for a waste services provider during performance of a waste service activity in the environments of FIG. 18 according to embodiments of the present disclosure.

FIG. 19 illustrates a high-level overview of a system and network according to various illustrative embodiments herein. The components and general architecture of the system and network may be adapted for use in the specific services environment of FIG. 18. The system can include one or more data sources 30 and a central server 35. Data sources 30 may be, for example, devices configured for capturing and communicating operational data indicative of one or more operational characteristics. Data sources 30 are configured to communicate with central server 35 by sending and receiving operational data over a network 45 (e.g., the Internet, an Intranet, or other suitable network). Central server 35 may be configured to process and evaluate operational data received from data sources 30 in accordance with user input received via a user interface provided on a local or remote computer.

Figure 20:
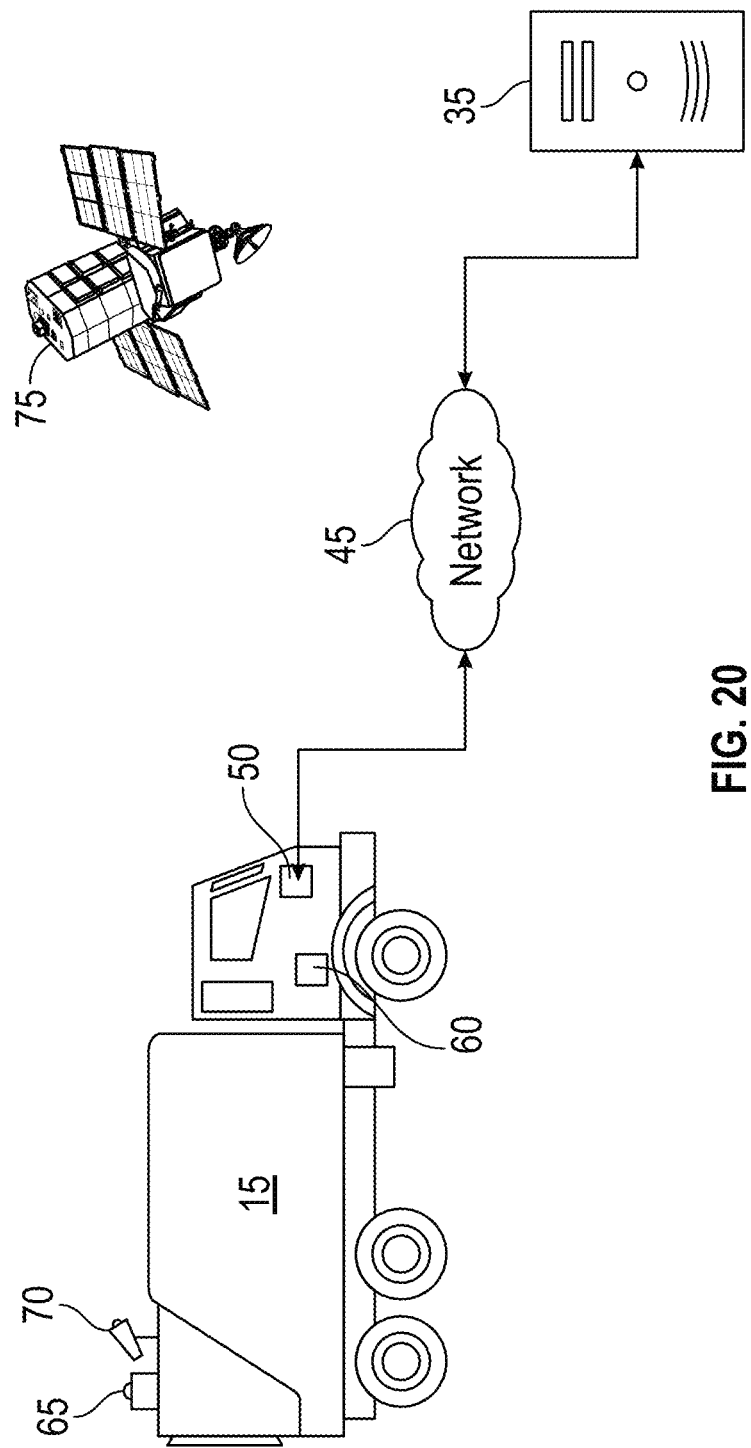
FIG. 20 an example of a communications network for a waste services vehicle according to embodiments of the present disclosure.
Figure 21:
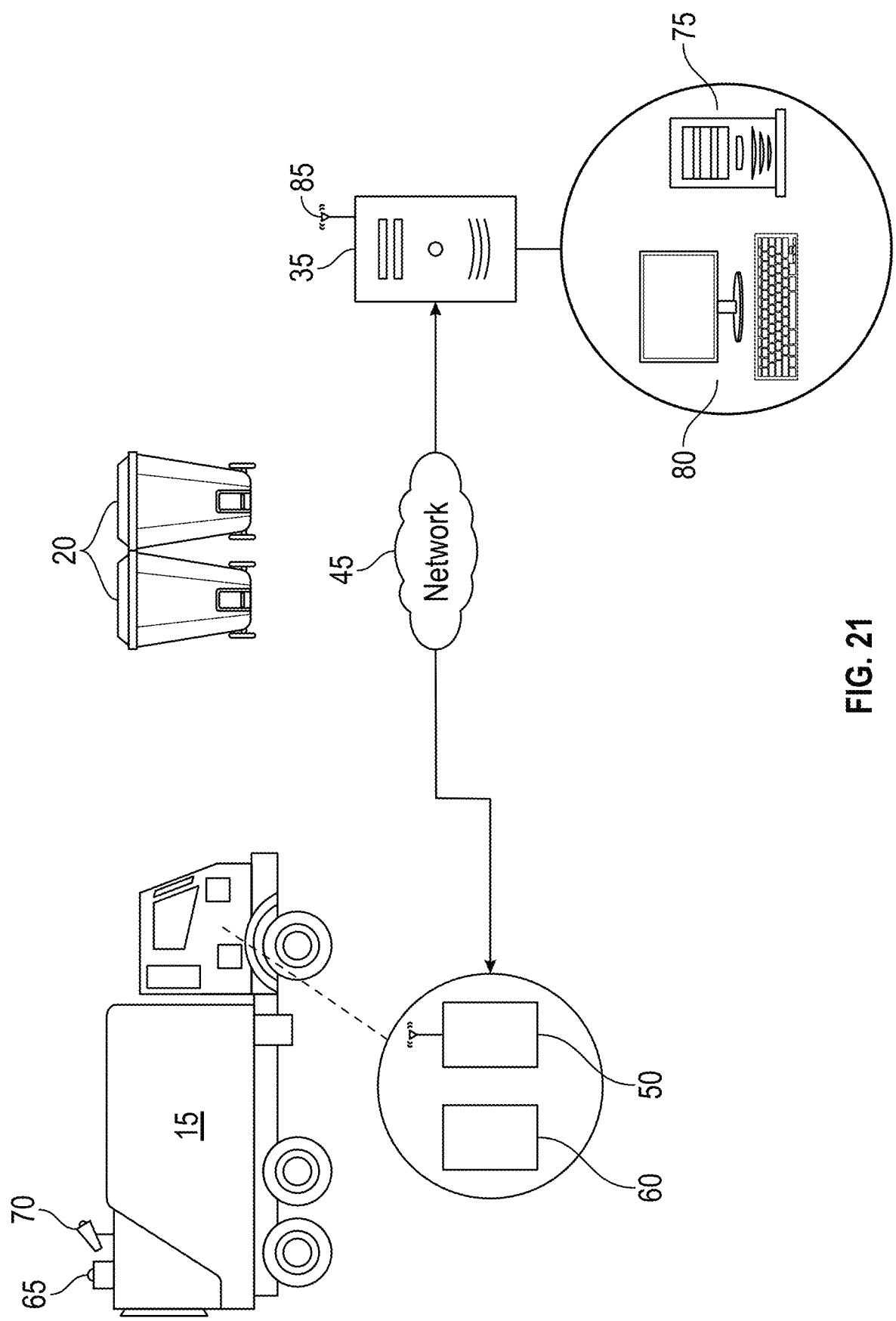
FIG. 21 is an example of a communications network for a waste services vehicle according to embodiments of the present disclosure.
Figure 22:
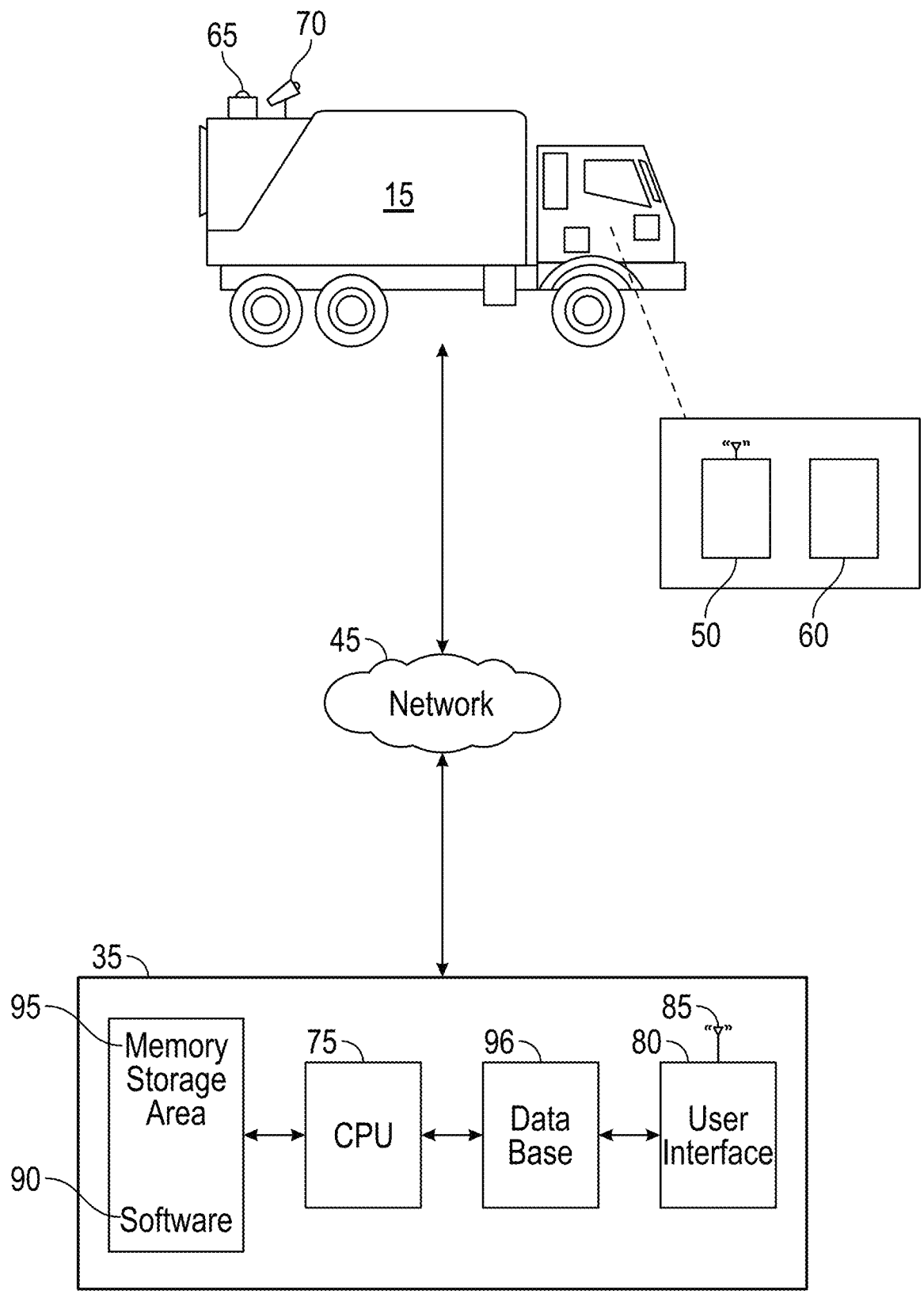
FIG. 22 is an example of a computing system according to embodiments of the present disclosure While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

In the illustrative embodiment shown in FIGS. 20-22, a system and network are provided wherein a communications device 50 can be disposed on waste service vehicle 15. Communications device 50 and central server 35 are configured to communicate with each other via a communications network 45 (e.g., the Internet, an Intranet, a cellular network, or other suitable network). In addition, communications device 50 and central server 35 are configured for storing data to an accessible central server database 96 located on, or remotely from, central server 35. In the description provided herein, the system may be configured for managing and evaluating the operation of a large fleet of service vehicles 15. As such, in certain illustrative embodiments, the system may further comprise a plurality of communications devices 50, each being associated with one of a plurality of waste service vehicles 15.

In certain illustrative embodiments, the communication between communications device 50 provided on-board service vehicle 15 and central server 35 may be provided on a real time basis such that during the collection/delivery route, data is transmitted between each service vehicle 15 and central server 35. Alternatively, communication device 50 may be configured to temporarily store or cache data during the route and transfer the data to the central server 35 on return of service vehicle 15 to the location of the collection/delivery company.

In certain illustrative embodiments, as illustrated in FIG. 20, service vehicle 15 can also include an onboard computer 60 and a location device 65. Onboard computer 60 can be, for example, a standard desktop or laptop personal computer ("PC"), or a computing apparatus that is physically integrated with vehicle 15, and can include and/or utilize various standard interfaces that can be used to communicate with location device 65 and optical sensor 70. Onboard computer 60 can also communicate with central server 35 via a communications network 45 via communication device 50. In certain illustrative embodiments, service vehicle 15 can also include one or more optical sensors 70 such as video cameras and relating processors for gathering image and other data at or near the customer site.

Location device 65 can be configured to determine the location of service vehicle 15 always while service vehicle 15 is inactive, in motion and operating and performing service related and nonservice related activities. For example, location device 65 can be a GPS device that can communicate with the collection/delivery company. A satellite 75 or other communications device can be utilized to facilitate communications. For example, location device 65 can transmit location information, such as digital latitude and longitude, to onboard computer 60 via satellite 75. Thus, location device 65 can identify the location of service vehicle 15, and therefore the location of the customer site where container 20 is located, after vehicle 15 has arrived at the customer site.

In the illustrative embodiment of FIGS. 21-22, an exemplary computer system and associated communication network is shown. In certain illustrative embodiments, central server 35 can be configured to receive and store operational data (e.g., data received from waste services vehicle 15) and evaluate the data to aid waste services company in improving operational efficiency. Central server 35 can include various means for performing one or more functions in accordance with embodiments of the present invention, including those more particularly shown and described herein; however, central server 35 may include alternative devices for performing one or more like functions without departing from the spirit and scope of the present invention.

In certain illustrative embodiments, central server 35 can include standard components such as processor 75 and user interface 80 for inputting and displaying data, such as a keyboard and mouse or a touch screen, associated with a standard laptop or desktop computer. Central server 35 also includes a communication device 85 for wireless communication with onboard computer 60.

Central server 35 may include software 90 that communicates with one or more memory storage areas 95. Memory storage areas 95 can be, for example, multiple data repositories which stores pre-recorded data pertaining to a plurality of customer accounts. Such information may include customer location, route data, items expected to be removed from the customer site, and/or billing data. For example, using the location (e.g., street address, city, state, and zip code) of a customer site, software 90 may find the corresponding customer account in memory storage areas 95. Database 96 for data storage can be in memory storage area 95 and/or supplementary external storage devices as are well known in the art.

While a "central server" is described herein, a person of ordinary skill in the art will recognize that embodiments of the present invention are not limited to a client-server architecture and that the server need not be centralized or limited to a single server, or similar network entity or mainframe computer system. Rather, the server and computing system described herein may refer to any combination of devices or entities adapted to perform the computing and networking functions, operations, and/or processes described herein without departing from the spirit and scope of embodiments of the present invention.

In certain illustrative embodiments, a system is provided for optimizing waste/recycling collection and delivery routes for waste/recycling service vehicles. Central server 35 may utilize memory storage area 95 and processor 75 in communication with memory storage area 95, and/or onboard computer 60 can be utilized, to perform the method steps described herein and communicate results to/from the vehicle, prior to and/or in real time during performance of the waste/recycling service activity.

In certain illustrative embodiments, software can execute the flow of one or more of the method steps of FIG. 17 herein, or any of the other method or process steps described herein, while interacting with the various system elements of FIGS. 18-22.

In certain illustrative embodiments, the presently disclosed systems and methods can also be utilized in connection with a centralized platform for remote, real-time customer management of waste/recycling pick-up and collection services. In certain illustrative embodiments, a system for facilitating selection and monitoring of waste/recycling pick-up and collection services by a customer can include a memory, an electronic viewing portal with a display for viewing by a customer, and a processor coupled to the memory programmed with executable instructions. The processor and/or memory can be configured to receive identifying information from a customer via the electronic viewing portal, associate the customer with stored customer information based on the identifying information, determine (using back end functionality) one or more waste/recycling pick-up and collection service options for the customer based on the stored customer information, which can include the use of customer and/or container discovery information based on GPS drive path analysis for a waste/recycling service vehicle as described in the various embodiments herein, display the one or more waste/recycling pick-up and collection service options on the display, receive instructions from the customer regarding which of the waste/recycling pick-up and collection service options to perform, and display the status of the performance of the one or more waste/recycling pick-up and collection service options on the electronic viewing portal for viewing by the customer. The customer facing applications may be present in the form of downloadable applications installable and executable on user devices, e.g., "electronic viewing portals" such as computers, smartphones, or tablets. Additionally (or alternatively), the customer applications may be available as one or more web applications, accessible via a client device having an internet browser. The customer facing applications can utilize customer service digitalization and allow a customer to select and/or monitor waste/recycling pick-up and collection services from the provider on a real-time basis, and the customer offerings can be based, in whole or in part, upon back end functionality that includes the use of customer and/or container discovery information based on GPS drive path analysis for a waste/recycling service vehicle, as described in the various embodiments herein. The presently disclosed systems and methods can also be utilized in connection with a centralized platform for remote, real-time customer management of other services besides waste/recycling pick-up and collection services, such as, for example, package delivery, logistics, transportation, food delivery, ride hailing, couriers, freight transportation, etc.

Those skilled in the art will appreciate that certain portions of the subject matter disclosed herein may be embodied as a method, data processing system, or computer program product. Accordingly, these portions of the subject matter disclosed herein may take the form of an entirely hardware embodiment, an entirely software embodiment, or an embodiment combining software and hardware. Furthermore, portions of the subject matter disclosed herein may be a computer program product on a computer-usable storage medium having computer readable program code on the medium. Any suitable computer readable medium may be utilized including hard disks, CD-ROMs, optical storage devices, or other storage devices. Further, the subject matter described herein may be embodied as systems, methods, devices, or components. Accordingly, embodiments may, for example, take the form of hardware, software or any combination thereof, and/or may exist as part of an overall system architecture within which the software will exist. The present detailed description is, therefore, not intended to be taken in a limiting sense.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. As used herein, the term "A and/or B" means embodiments having element A alone, element B alone, or elements A and B taken together.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A method of identifying a residential customer location on a service route for a waste or recycling service vehicle, the method comprising:
    collecting location information for the waste or recycling service vehicle during a plurality of time intervals as the service vehicle travels along the service route, wherein the location information is collected using a global positioning system (GPS) associated with the waste or recycling service vehicle;
    associating the location information with street network data relating to the service route, wherein the street network data comprises spatial geometry of the street;
    identifying a vehicle stop point on the service route based on one or more of: (i) a determination that the location information for two consecutive time intervals is the same or similar; and/or (ii) a determination based on low speed of the vehicle indicating that customer service is being performed, wherein low speed of the vehicle comprises average vehicle speed of less than 0.5 miles per hour for a time period of greater than 1-3 minutes;
    determining whether there is a correspondence between the vehicle stop point and parcel data information relating to the service route; and
    designating the location of the residential customer at a parcel from the parcel data information corresponding to the vehicle stop point, wherein the parcel data information comprises:
    a parcel owner name;
    an address of the parcel;
    a type of land use associated with the parcel;
    geographic information relating to the spatial geometry of the boundary of the parcel; and
    geographic information relating to the centroid of the parcel.

2. The method of claim 1, wherein the street network data further comprises a street name, a street type, address ranges, length of the street segment associated with the address ranges, location of the vehicle on the street, and a side of the street on which residential waste or recycling services are provided.

3. The method of claim 1, further comprising:
    displaying a segment of the service route on a geographic map on a display screen of a computerized user device; and
    identifying the vehicle stop point on the service route.

4. The method of claim 1, further comprising:
repeating the steps of collecting, associating, identifying, and determining for a plurality of iterations of the service vehicle traveling along the service route; and
designating the location of the residential customer at the parcel corresponding to the vehicle stop point based on the plurality of iterations.

5. The method of claim 1, wherein the time intervals for collecting GPS pings are ten seconds or less.

6. A system for identifying a residential customer location on a service route for a waste or recycling service vehicle, the system comprising:
a waste or recycling service vehicle;
a memory storage area; and
a processor in communication with the memory storage area and configured to:
collect location information for the waste or recycling service vehicle during a plurality of time intervals as the service vehicle travels along the service route, wherein the location information is collected using a global positioning system (GPS) associated with the waste or recycling service vehicle;
associate the location information with street network data relating to the service route, wherein the street network data comprises spatial geometry of the street;
identify a vehicle stop point on the service route based on one or more of: (i) a determination that the location information for two consecutive time intervals is the same or similar; and/or (ii) a determination based on low speed of the vehicle indicating that customer service is being performed, wherein low speed of the vehicle comprises average vehicle speed of less than 0.5 miles per hour for a time period of greater than 1-3 minutes;
determine whether there is a correspondence between the vehicle stop point and parcel data information relating to the service route; and
designate the location of the residential customer at a parcel from the parcel data information corresponding to the vehicle stop point, wherein the parcel data information comprises:
a parcel owner name;
an address of the parcel;
a type of land use associated with the parcel;
geographic information relating to the spatial geometry of the boundary of the parcel; and
geographic information relating to the centroid of the parcel.

7. The method of claim 1, wherein the time intervals are ten seconds are less, and wherein the method further comprises: verifying the location of the commercial customer at the vehicle stop point based on user data provided by a user on a computing device onboard the service vehicle and relating to the service route.

8. A method of identifying a residential container location on a service route for a waste or recycling service vehicle, the method comprising:
collecting location information for the waste or recycling service vehicle during a plurality of time intervals as the service vehicle travels along the service route, wherein the location information is collected using a global positioning system (GPS) associated with the waste or recycling service vehicle;
associating the location information with street network data relating to the service route, wherein the street network data comprises spatial geometry of the street;
identifying a vehicle stop point on the service route based on one or more of: (i) a determination that the location information for two consecutive time intervals is the same or similar; and/or (ii) a determination based on low speed of the vehicle indicating that customer service is being performed, wherein low speed of the vehicle comprises average vehicle speed of less than 0.5 miles per hour for a time period of greater than 1-3 minutes;
determining whether there is a correspondence between the vehicle stop point and parcel data information relating to the service route;
designating the location of the residential customer at a parcel from the parcel data information corresponding to the vehicle stop point; and
designating a container location for the residential customer at the vehicle stop point based on customer account properties associated with the vehicle stop point, wherein the customer account properties comprise one or more of: (i) geographic location of stop point; or (ii) time of stop point, and wherein the parcel data information comprises:
a parcel owner name;
an address of the parcel;
a type of land use associated with the parcel;
geographic information relating to the spatial geometry of the boundary of the parcel; and
geographic information relating to the centroid of the parcel.

9. A system for identifying a residential container location on a service route for a waste or recycling service vehicle, the system comprising:
a waste or recycling service vehicle;
a memory storage area; and
a processor in communication with the memory storage area and configured to:
collect location information for the waste or recycling service vehicle during a plurality of time intervals as the service vehicle travels along the service route, wherein the location information is collected using a global positioning system (GPS) associated with the waste or recycling service vehicle;
associate the location information with street network data relating to the service route, wherein the street network data comprises spatial geometry of the street;
identify a vehicle stop point on the service route based on one or more of: (i) a determination that the location information for two consecutive time intervals is the same or similar; and/or (ii) a determination based on low speed of the vehicle indicating that customer service is being performed, wherein low speed of the vehicle comprises average vehicle speed of less than 0.5 miles per hour for a time period of greater than 1-3 minutes;
determine whether there is a correspondence between the vehicle stop point and parcel data information relating to the service route;
designate the location of the residential customer at a parcel from the parcel data information corresponding to the vehicle stop point; and
designate a container location for the residential customer at the vehicle stop point based on customer account properties associated with the vehicle stop point, wherein the customer account properties comprise one or more of: (i) geographic location of stop point; or (ii) time of stop point, and wherein the parcel data information comprises:

a parcel owner name;

an address of the parcel;

a type of land use associated with the parcel;

geographic information relating to the spatial geometry of the boundary of the parcel; and geographic information relating to the centroid of the parcel.

10. The method of claim 1, wherein the street network data further comprises a street network having a digital representation of a street in a vector file format, and wherein a single segment of the street network is an edge, and wherein geometry of the edge is presented as a collection of two or more points on the edge.

11. The system of claim 6, wherein the street network data further comprises a street network having a digital representation of a street in a vector file format, and wherein a single segment of the street network is an edge, and wherein geometry of the edge is presented as a collection of two or more points on the edge.

12. The method of claim 8, wherein the street network data further comprises a street network having a digital representation of a street in a vector file format, and wherein a single segment of the street network is an edge, and wherein geometry of the edge is presented as a collection of two or more points on the edge.

13. The system of claim 9, wherein the street network data further comprises a street network having a digital representation of a street in a vector file format, and wherein a single segment of the street network is an edge, and wherein geometry of the edge is presented as a collection of two or more points on the edge.

14. The method of claim 1, wherein the designating of the location of the residential customer at the parcel comprises discovery of a positively identified customer at the location.

15. The system of claim 6, wherein the designating of the location of the residential customer at the parcel comprises discovery of a positively identified customer at the location.

16. The method of claim 8, wherein the designating of the location of the residential customer at the parcel comprises discovery of a positively identified customer at the location.

17. The system of claim 9, wherein the designating of the location of the residential customer at the parcel comprises discovery of a positively identified customer at the location.

18. The method of claim 1, wherein the parcel data comprises a parcel data network with spatial geometry of the parcel.

19. The system of claim 6, wherein the parcel data comprises a parcel data network with spatial geometry of the parcel.

20. The method of claim 8, wherein the parcel data comprises a parcel data network with spatial geometry of the parcel.

21. The system of claim 9, wherein the parcel data comprises a parcel data network with spatial geometry of the parcel.

22. The system of claim 6, wherein the street network data further comprises a street name, a street type, address ranges, length of the street segment associated with the address ranges, location of the vehicle on the street, and a side of the street on which residential waste or recycling services are provided.

23. The method of claim 8, wherein the street network data further comprises a street name, a street type, address ranges, length of the street segment associated with the address ranges, location of the vehicle on the street, and a side of the street on which residential waste or recycling services are provided.

24. The system of claim 9, wherein the street network data further comprises a street name, a street type, address ranges, length of the street segment associated with the address ranges, location of the vehicle on the street, and a side of the street on which residential waste or recycling services are provided.

* * * * *